(12) United States Patent
Bussa et al.

(10) Patent No.: US 12,093,169 B2
(45) Date of Patent: **\*Sep. 17, 2024**

(54) INTELLIGENT DYNAMIC WEB SERVICE TESTING APPARATUS IN A CONTINUOUS INTEGRATION AND DELIVERY ENVIRONMENT

(71) Applicant: Bank of America Corporation, Charlotte, NC (US)

(72) Inventors: Swathi Bussa, Hyderabad (IN); Suresh Krishnan Narayanamoorthy, Hyderabad (IN); Savitri Jaganath Podal, Mumbai (IN); Amrut Gopal Nayak, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,363

(22) Filed: Apr. 27, 2023

(65) Prior Publication Data

US 2023/0259450 A1 Aug. 17, 2023

Related U.S. Application Data

(63) Continuation of application No. 17/370,883, filed on Jul. 8, 2021, now Pat. No. 11,687,441.

(51) Int. Cl.
*G06F 11/36* (2006.01)
*G06F 8/60* (2018.01)
*G06N 20/00* (2019.01)

(52) U.S. Cl.
CPC ............ *G06F 11/3684* (2013.01); *G06F 8/60* (2013.01); *G06F 11/3688* (2013.01); *G06F 11/3692* (2013.01); *G06N 20/00* (2019.01)

(58) Field of Classification Search
CPC .. G06F 11/36; G06F 11/3684; G06F 11/3688; G06F 11/3692; G06F 11/3664
See application file for complete search history.

(56) References Cited

U.S. PATENT DOCUMENTS 7,093,238 B2    8/2006    Givoni et al.
7,779,374 B1    8/2010    Hamid et al.
8,468,244 B2    6/2013    Redlich et al.

(Continued)

OTHER PUBLICATIONS

Feb. 15, 2023—Notice of Allowance—U.S. Appl. No. 17/370,883.
Feb. 16, 2023—Non-Final Office Action—U.S. Appl. No. 17/370,977.

*Primary Examiner* — Kamini B Patel
(74) *Attorney, Agent, or Firm* — Banner & Witcoff, Ltd.

(57) ABSTRACT

Aspects of the disclosure relate to conducting automated web service testing in a continuous integration and delivery test deployment environment using artificial intelligence (AI) generated test data. In some embodiments, a computing platform may receive, from a developer computing platform, a test code request, receive, from a web service computing platform, a training data set, configure a test data set based on the training data set and the test code request, use AI engine to apply one or more corrections to the test data set based on the test code request and to produce a corrected test data set, execute the test code using the corrected test data set to produce test code output results, and send, to the developer computing platform, the test code output results.

20 Claims, 16 Drawing Sheets

(56) References Cited

U.S. PATENT DOCUMENTS

| | | |
|---|---|---|
| 8,825,460 B2 | 9/2014 | Walenta et al. |
| 10,073,763 B1* | 9/2018 | Raman .............. G01R 31/31835 |
| 11,055,639 B1* | 7/2021 | Cay ......................... G06F 9/547 |
| 11,233,693 B2 | 1/2022 | Misra et al. |
| 11,501,237 B2 | 11/2022 | Tiwari et al. |
| 2003/0126517 A1 | 7/2003 | Givoni et al. |
| 2013/0086556 A1* | 4/2013 | Grechanik .......... G06F 11/3684 |
| | | 717/126 |
| 2018/0329808 A1 | 11/2018 | Friedenberg |
| 2018/0329812 A1 | 11/2018 | Friedenberg |
| 2019/0129409 A1 | 5/2019 | Cella et al. |
| 2019/0196948 A1* | 6/2019 | Raman ................... G06N 20/00 |
| 2019/0196949 A1* | 6/2019 | Venkataraman ...... G06F 11/008 |
| 2019/0196950 A1* | 6/2019 | Ranganathan ............. G06F 8/10 |
| 2019/0213116 A1* | 7/2019 | Kulkarni ............. G06F 11/3684 |
| 2019/0370160 A1* | 12/2019 | Raman ................ G06F 11/3476 |
| 2020/0133828 A1 | 4/2020 | Friedenberg |
| 2020/0158780 A1* | 5/2020 | Ranganathan ...... G06F 11/3438 |
| 2020/0412599 A1 | 12/2020 | Misra et al. |
| 2021/0097407 A1 | 4/2021 | Pan et al. |
| 2021/0158257 A1 | 5/2021 | Shepard et al. |
| 2022/0044179 A1 | 2/2022 | Tiwari et al. |
| 2022/0350733 A1 | 11/2022 | Vasavan et al. |
| 2022/0357935 A1 | 11/2022 | Vecera et al. |
| 2022/0391185 A1 | 12/2022 | Donahue et al. |
| 2023/0019856 A1* | 1/2023 | Lara Maldonado ........................ |
| | | G06Q 10/063112 |

* cited by examiner

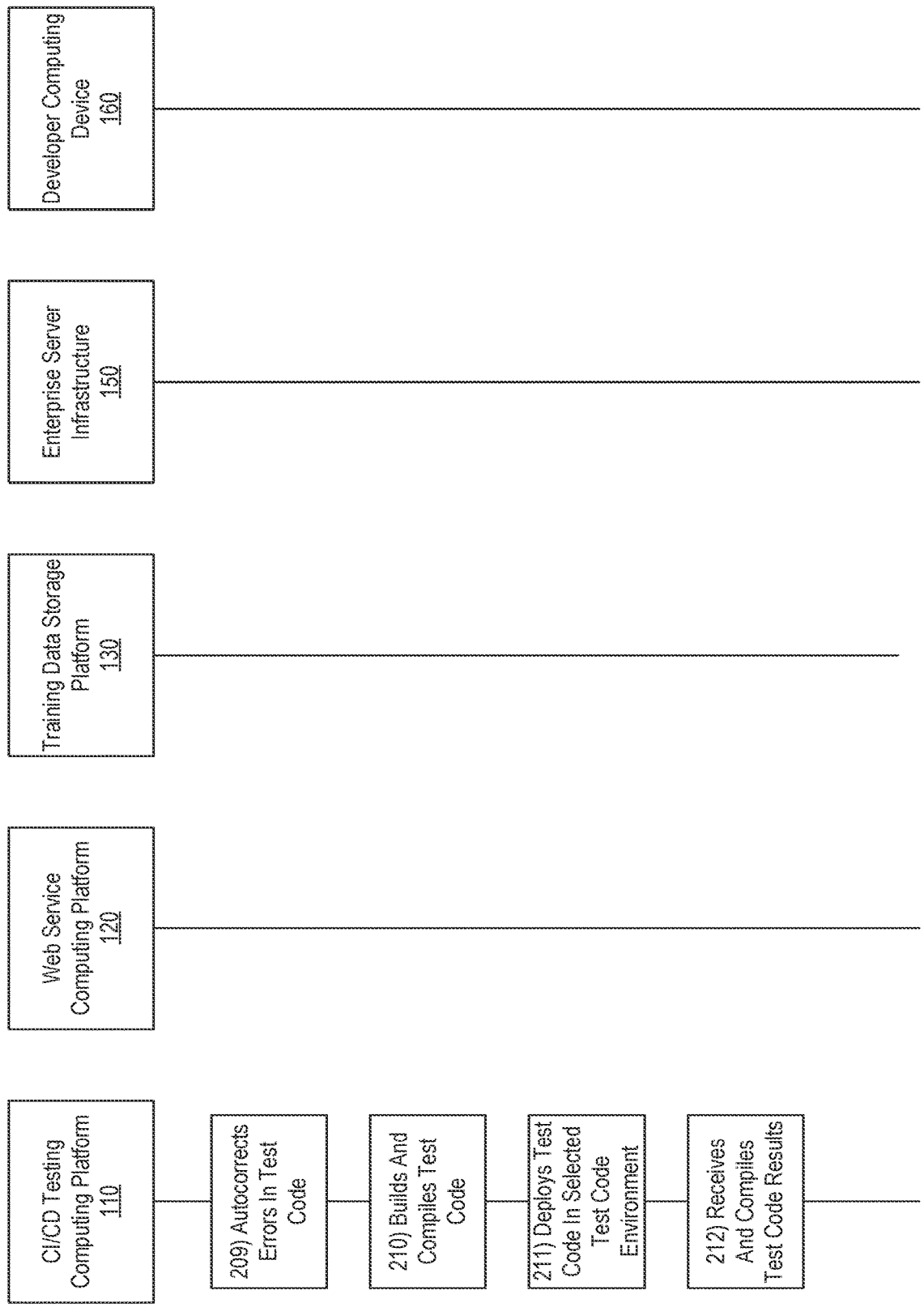

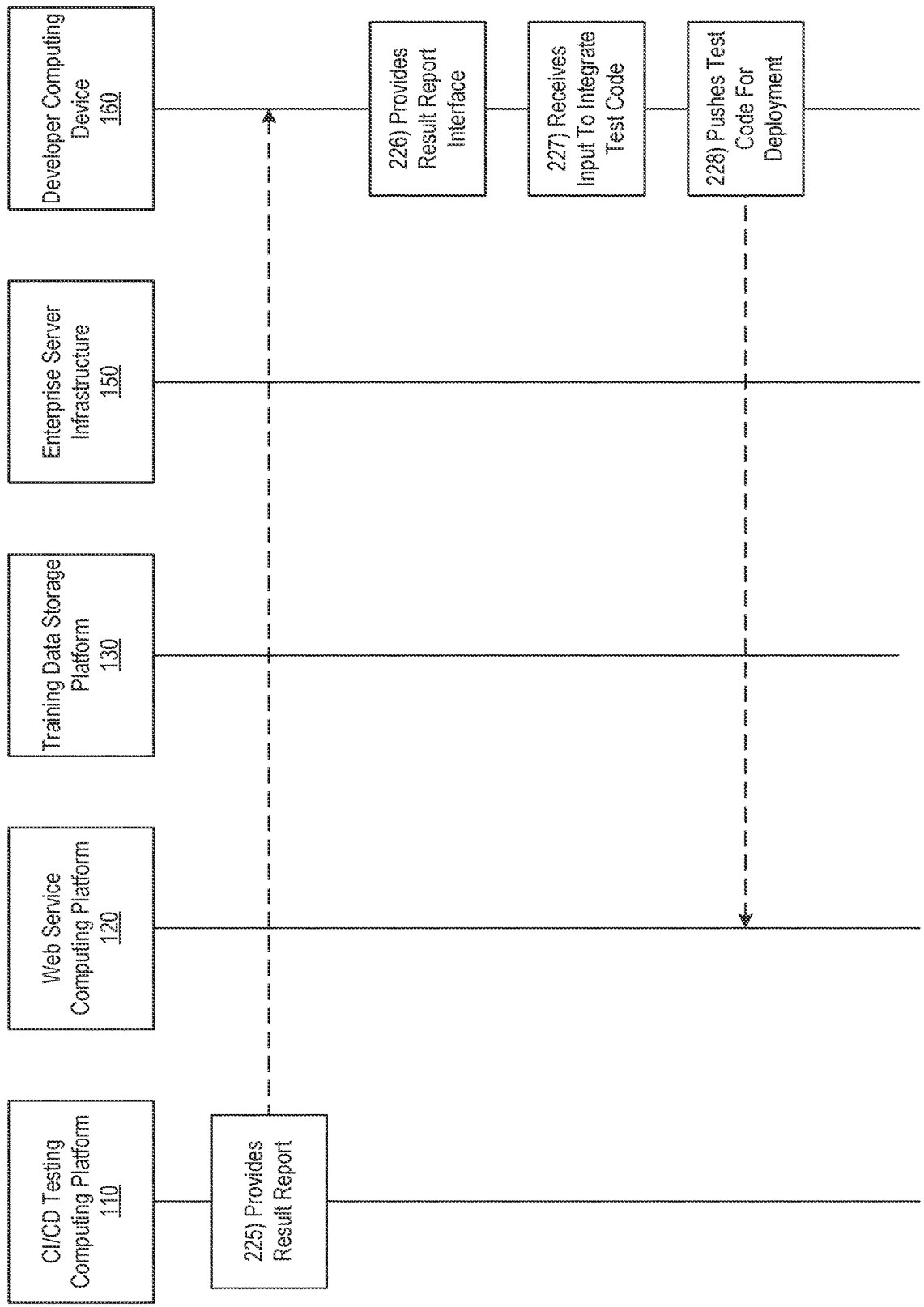

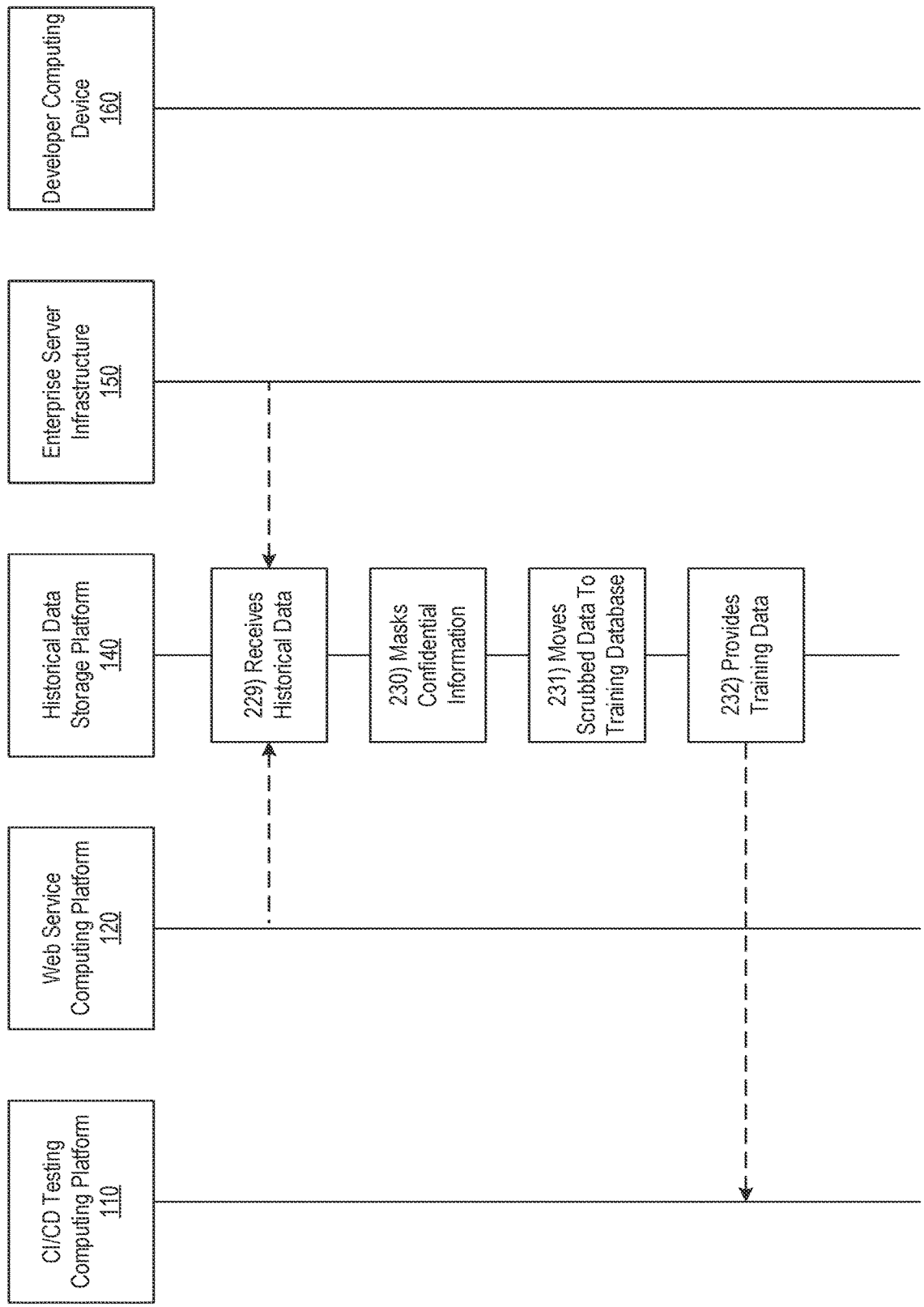

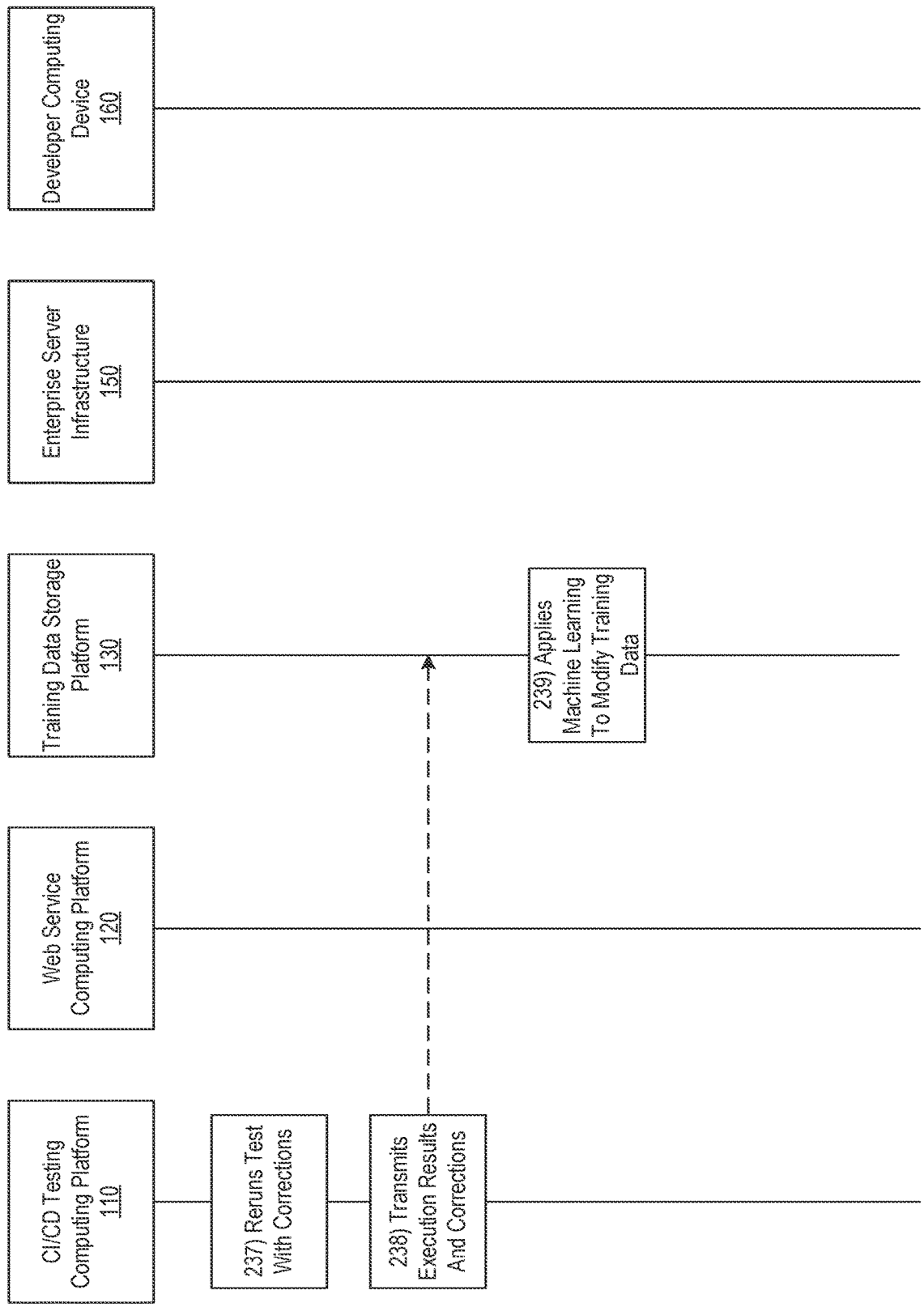

INTELLIGENT DYNAMIC WEB SERVICE TESTING APPARATUS IN A CONTINUOUS INTEGRATION AND DELIVERY ENVIRONMENT

CROSS REFERENCE TO RELATED APPLICATIONS

Background

This application is a continuation of and claims priority to U.S. patent application Ser. No. 17/370,883, filed Jul. 8, 2021, and entitled "Intelligent Dynamic Web Service Testing Apparatus In a Continuous Integration and Delivery Environment," which is incorporated herein by reference in its entirety.

BACKGROUND

Enterprise organizations frequently have investments in software testing that often span numerous tools running on multiple platforms (e.g., different operating systems) to test various applications and/or systems. Many software tests require the use of a dataset to ensure that the tested software works for its intended purpose. In many instances, such datasets may be generated specific to a particular software test or type of software test. In order to ensure useful results from the software test, some systems may generate a dataset with a series of manual manipulation steps suitable for the software to be tested. However, preparation of such test datasets may be time intensive and costly, and may miss errors in the tested software. To improve both efficiency and usability, there is a need for testing software applications on improved test datasets that overcome the above shortcomings.

SUMMARY

Aspects of the disclosure provide effective, efficient, scalable, and convenient technical solutions that address and overcome the technical problems associated with software testing by providing intelligent dynamic web service testing in a continuous integration and delivery environment, for example, by building a web service test data set based on historical data and test code deployment parameters using artificial intelligence (AI) models, or by conducting automated web service testing to validate requirement changes in a continuous integration and delivery test deployment environment using an AI-generated test data set.

In accordance with one or more embodiments, a computing platform having at least one processor, a communication interface, and memory may receive, via the communication interface, and from a web service computing platform, a historical data set comprising data relating to a web service application. Subsequently, the computing platform may create a training data set based on the historical data set, in which the training data set includes one or more components specific to a type of deployment environment and to a web service application. The computing platform may then receive, via the communication interface, a first test code request from a developer computing platform, in which the first test code request includes a first set of test code parameters. The computing platform may then configure a first test data set from the training data set based on the first test code request, and cause a first test to be executed based on the first test data set. The computing platform may thereafter receive a first set of test code execution results that includes results from execution of a test code pursuant to the first test code request using the first set of test code parameters and the first test data set. The computing platform may then use an AI engine to modify the training data set based on the first set of test code execution results, wherein the AI engine produces a modified training data set.

In some embodiments, the computing platform may receive, via the communication interface, a second test code request from the developer computing platform, wherein the second test code request includes a second set of test code parameters. In response to receiving the second test code request, the computing platform may then configure a second test data set based on the modified training data set, and cause a second test to be executed based on the second test data set. In some instances, the web service application may provide back office functions for a financial institution.

In some embodiments, the deployment environment may include one of a component integration testing environment, a systems integration testing environment, and a technology testing environment. The first set of test code parameters may include at least one of a threshold amount of test code to complete or a threshold amount of load. In some examples, configuring the first test data set from the training data set may include performing an error check on the test data set. Configuring the first test data set from the training data set may include autocorrecting one or more errors in the test data set based on the error check.

In some embodiments, creating the training data set based on the historical data set may include determining a test code type based on the web service application, accessing the historical data set from a historical data storage platform associated with the web service application, and generating the training data set based on the historical data set and in accordance with the test code type.

In some embodiments, using the AI engine to modify the training data set may include performing an anomaly check on the first set of test code execution results, performing a failure check on the first set of test code execution results, and modifying the training data set based on the anomaly check and the failure check. In some examples, using the AI engine to modify the training data set may include training a machine learning classification model to the first set of test code execution results to generate the modified training data set. Receiving the encrypted confidential data may include compiling, by the enterprise data storage database, confidential data for transmission and encrypting the confidential data upon being transmitted by the enterprise data storage database.

In some embodiments, the memory may store additional computer-readable instructions that, when executed by the at least one processor, cause the computing platform to transmit, to a developer computing platform, a result report including results relating to at least the first set of test code execution results, wherein the developer computing platform is configured to provide a result report interface displaying one or more components of the result report. The result report interface may include a selectable option to push the test code for deployment in accordance based on an indication of success in the result report.

In some embodiments, creating the training data set based on the historical data set may include performing a confidential data verification check and, upon detecting confidential data in the training data set, masking the confidential data in the training data. Creating the training data set based on the historical data set may include using the AI engine to modify the training data set based on test data parameters associated with the one or more components specific to the first test code request.

In accordance with one or more embodiments, a method is provided at a computing platform comprising at least one processor, a communication interface, and memory. The method may include receiving, via the communication interface, from a web service computing platform, a historical data set comprising data relating to a web service application, receiving, via the communication interface and from a developer computing platform, a first test code request that includes a first set of test code parameters, creating a training data set based on the historical data set, wherein the training data set includes one or more components specific to the first set of test code parameters, configuring a first test data set from the training data set based on the first test code request, causing a first test to be executed based on the first test data set, receiving, via the communication interface, a first set of test code execution results that includes results from execution of a test code pursuant to the first test code request using the first set of test code parameters and the first test data set, and using an AI engine to modify the training data set based on the first set of test code execution results, in which the AI engine produces a modified training data set configured to be inputted during execution of a subsequent test.

In some embodiments, the method may further include receiving, via the communication interface and from the developer computing platform, a second test code request that includes a second set of test code parameters, configuring a second test data set based on the modified training data set and in response to receiving the second test code request, and causing a second test to be executed based on the second test data set.

In some embodiments, creating the training data set based on the historical data may include determining a test code type based on the web service application, accessing the historical data set from a historical data storage platform associated with the web service application, and generating the training data set based on the historical data set and in accordance with the test code type. Configuring the first test data set from the training data set may include performing an error check on the test data set and autocorrecting one or more errors in the test data set based on the error check. Using the AI engine to modify the training data set may include training a machine learning classification model to the first set of test code execution results to generate the modified training data set.

In accordance with one or more embodiments, one or more non-transitory computer-readable media may be provided storing instructions that, when executed by a computing platform comprising at least one processor, a communication interface, and memory cause the computing platform to receive, via the communication interface and from a web service computing platform, a historical data set comprising data relating to a web service application, create a training data set based on the historical data set, wherein the training data set includes one or more components specific to a type of deployment environment and to a web service application, receive, via the communication interface and from a developer computing platform, a first test code request that includes a first set of test code parameters, configure a first test data set from the training data set based on the first test code request, cause a first test to be executed based on the first test data set, receive a first set of test code execution results that includes results from execution of a test code pursuant to the first test code request using the first set of test code parameters and the first test data set, use an AI engine to modify the training data set based on the first set of test code execution results, wherein the AI engine produces a modified training data set, receive, via the communication interface and from the developer computing platform, a second test code request that includes a second set of test code parameters, in response to receiving the second test code request, configure a second test data set based on the modified training data set, and cause a second test to be executed based on the second test data set.

In accordance with one or more embodiments, a computing platform having at least one processor, a communication interface, and memory may receive, via the communication interface and from a developer computing platform, a test code request including a test code. Subsequently, the computing platform may receive, via the communication interface and from a web service computing platform, a training data set, and then configure a test data set based on the training data set and the test code request. The computing platform may then use an AI engine to apply one or more corrections to the test data set based on the test code request, wherein using the AI engine produces a corrected test data set, and thereafter execute the test code using the corrected test data set, wherein executing the test code produces test code output results. The computing platform may then send, via the communication interface, and to the developer computing platform, test code output results.

In some embodiments, sending the test code output results may include providing a result report interface including a selectable option to push the test code for deployment based on an indication of success in the test code output results. Sending the test code output results may include at least one of: a success/failure status of the test code, a trace of any errors in the test code, an exception caught during execution of the test code, an error in the corrected test data set, or an explanation of a failure indication. In some examples, the computing platform may transmit, to a developer computing platform, a result report including results relating to the test code output results, and the developer computing platform may be configured to provide a result report user interface displaying one or more components of the result report.

In some embodiments, receiving the test code request may include receiving one or more test deployment parameters for executing the test code. The one or more test deployment parameters may include as least one of: a deployment environment, a programming language, a programming dependency, or a relying subsystem. In some examples, executing the test code using the corrected test data set may include building and compiling the test code on the computing platform based on the test code request.

In some embodiments, the memory may store additional computer-readable instructions that, when executed by the at least one processor, cause the computing platform to receive a selected deployment environment. Executing the test code using the corrected test data set may then include executing the test code on the selected deployment environment.

In some embodiments, sending the test code output results may include compiling error information. Sending the test code output results may include providing a user interface display on a computing device associated with the developer computing platform. The user interface display may include information related to the test code output results.

In accordance with one or more embodiments, a method is provided at a computing platform comprising at least one processor, a communication interface, and memory. The method may include receiving, via the communication interface and from a developer computing platform, a test code request that includes a test code, receiving, via the communication interface and from a web service computing platform, a training data set, configuring a test data set based on the training data set and the test code request, using an AI engine to apply one or more corrections to the test data set based on the test code request, in which the AI engine produces a corrected test data set, executing the test code using the corrected test data set to produce test code output results, and generating a result display interface that includes the test code output results.

In some embodiments, receiving, via the communication interface and from the developer computing platform, a second test code request that includes a second set of test code parameters, in response to receiving the second test code request, configuring a second test data set based on the training data set and the second test code request, and causing a second test to be executed based on the second test data set. Receiving the test code request may include receiving one or more test deployment parameters for executing the test code. The one or more test deployment parameters may include as least one of: a deployment environment, a programming language, a programming dependency, or a relying subsystem.

In some embodiments, executing the test code using the corrected test data set may include building and compiling the test code on the computing platform based on information received from the developer computing platform. In some examples, the method may further include receiving a selected deployment environment. Executing the test code using the corrected test data set may then include executing the test code on the selected deployment environment.

In some embodiments, generating the result display interface may include providing a selectable option to push the test code for deployment based on an indication of success in the test code output results. Generating the result display interface may include compiling error information. Generating the result display interface may include providing a user interface on a computing device associated with the developer computing platform, and wherein the user interface includes a plurality of selectable interface components related to the test code output results.

In accordance with one or more embodiments, one or more non-transitory computer-readable media may be provided storing instructions that, when executed by a computing platform comprising at least one processor, a communication interface, and memory cause the computing platform to receive, via the communication interface and from a developer computing platform, a test code request that includes a test code and one or more test deployment parameters, receive, via the communication interface and from a web service computing platform, a training data set, configure a test data set based on the training data set and the test code request, automatically apply one or more corrections to the test data set using an AI engine to produce a corrected test data set, wherein the one or more corrections are applied based on the one or more test deployment parameters, execute the test code using the corrected test data set and to produce test code output results, and send, via the communication interface and to the developer computing platform, the test code output results.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for conducting software testing in a continuous integration and delivery environment using AI-generated test data in accordance with one or more example embodiments;

DETAILED DESCRIPTION

Figure 1A:
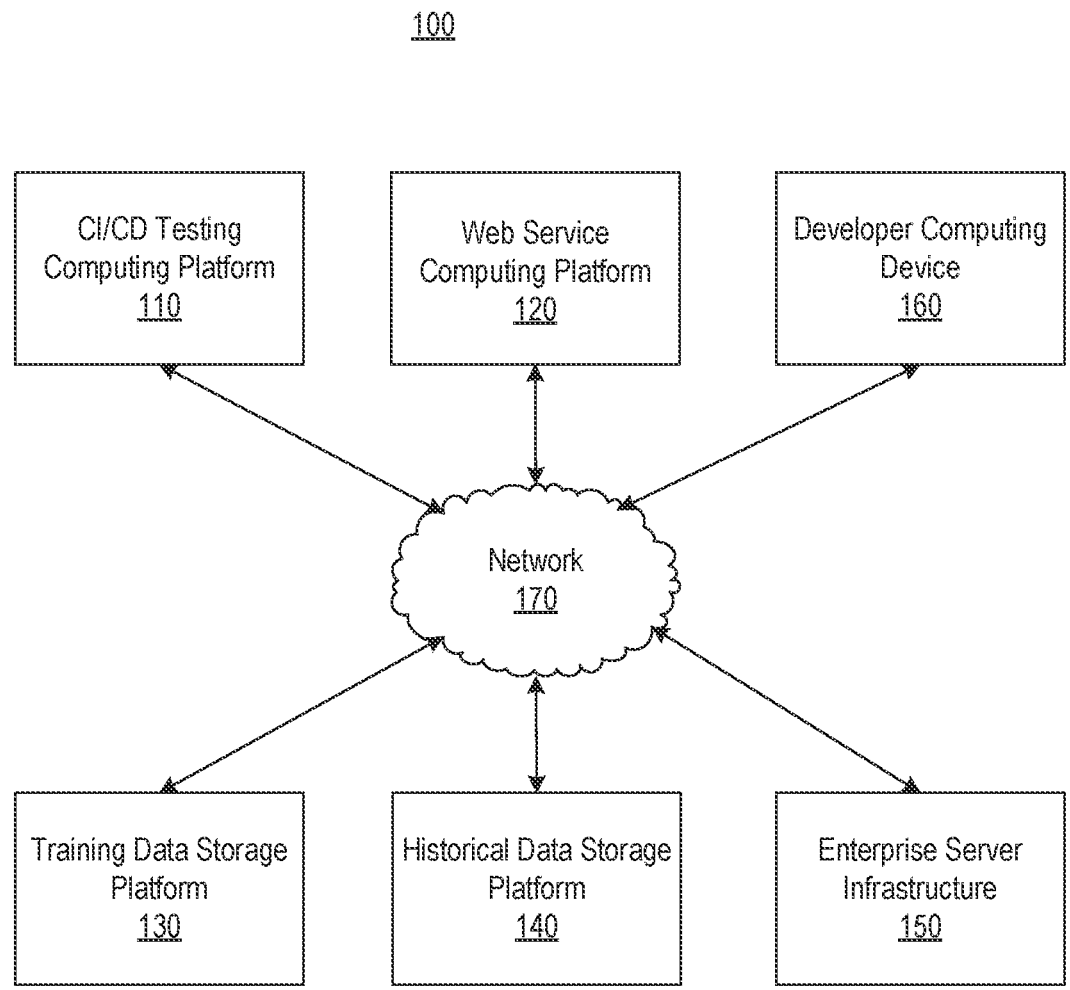
FIGS. 1A and 1B depict an illustrative computing environment for conducting software testing in a continuous integration and delivery environment using AI-generated test data in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to conducting software testing in a continuous integration and delivery environment using AI-generated test data. In some examples, a test data set may be built based on historical data and test code deployment parameters using AI models. In some examples, automated software testing in a continuous integration and delivery environment using AI-generated test data may be conducted to validate requirement changes in a web service application.

Continuous integration and delivery environments may be used to verify test codes, e.g., that handle various requirement changes built into the test code. Such test codes often use a test data set, processed to meet various criteria associated with the test code, such as code cover, load performance, and the like. However, the processing for such existing test data sets is often time test consuming and requires manual data manipulation to meet the test code requirements. Often, issues in the test data set may be overlooked, leading to unreliable or inaccurate test code results.

In order to address the above-noted shortcomings, a computing platform may employ artificial intelligence and/or machine learning models to automatically generate a test data set suitable for specific parameters associated with a test code. For example, machine learning models, such as supervised algorithms, recurrent reinforcement learning algorithms, natural language processing (NLP) techniques, and the like, may be used to generate a test data set in accordance with requirement changes of the test code. Artificial intelligence machine learning models may be used to automate test data set generation, e.g., based on an existing test data set and one or more parameters associated with executing the test code in a continuation integration and delivery environment.

In one example, an artificial intelligence component may use existing historical training data to generate test data that meets various criteria for a test code execution. Due to the dynamic requirement changes in a continuous integration and continuous delivery model, users often have to run test data for every deployment across various test environments. During each run, the test data typically requires some corrections, and the user must manually update the test data to cover the various requirement changes. Accordingly, the systems and methods described herein seek to automate the processes for creating test data sets using artificial intelligence and machine learning models.

In some embodiments, a web service test data set may be built based on historical data and test code deployment parameters using artificial intelligence models. In a computing platform having at least one processor, a communication interface communicatively coupled to the at least one processor, and memory storing computer-readable instructions that, when executed by the at least one processor, cause the computing platform to perform a number of steps. The computing platform may first receive, via the communication interface, from a web service computing platform, a historical data set comprising data relating to a web service application; wherein the web service application provides back office functions for a financial institution. The computing platform may thereafter create a training data set based on the historical data set, wherein the training data set includes one or more components specific to a type of deployment environment and to a web service application. Subsequently, the computing platform may receive, via the communication interface, a first test code request from a developer computing platform, wherein the first test code request includes a first set of test code parameters. The computing platform may then configure a first test data set from the training data set based on the first test code request and cause a first test to be executed based on the first test data set. Thereafter, the computing platform may receive a first set of test code execution results that includes results from execution of a test code pursuant to the first test code request using the first set of test code parameters and the first test data set. The computing platform may then analyze the first set of test code execution results. Based on analyzing the test code execution results, the computing platform may use an artificial intelligence (AI) engine to modify the training data set based on the first set of test code execution results, wherein the AI engine produces a modified training data set. The computing platform may thereafter receive, via the communication interface, a second test code request from the developer computing platform, wherein the second test code request includes a second set of test code parameters, and in response to receiving the second test code request, configure a second test data set from based on the modified training data set based on the second test code request, and subsequently cause a second test to be executed based on the second test data set.

In some embodiments, automated web service testing may be conducted to validate requirements changes in a continuous integration and delivery test deployment environment using an AI-generated test data set. By a computing platform having at least one processor, a communication interface communicatively coupled to the at least one processor, and memory storing computer-readable instructions that, when executed by the at least one processor, cause the computing platform to perform a number of steps. The computing platform may first receive, via the communication interface, from a developer computing platform, a test code request, the test text code request including a test code and one or more test deployment parameters, and receive, via the communication interface, from a web service computing platform, a training data set. The computing platform may thereafter configure a test data set based on the training data set and the test code request, analyze the test data set, wherein analyzing the test data set includes using an artificial intelligence (AI) engine to apply one or more corrections to the test data set based on the one or more test deployment parameters, and wherein using the AI engine produces a corrected test data set, execute the test code using the corrected test data set, wherein executing the test code produces test code output results, and send, via the communication interface, to the developer computing platform, the test code output results.

Figure 1B:
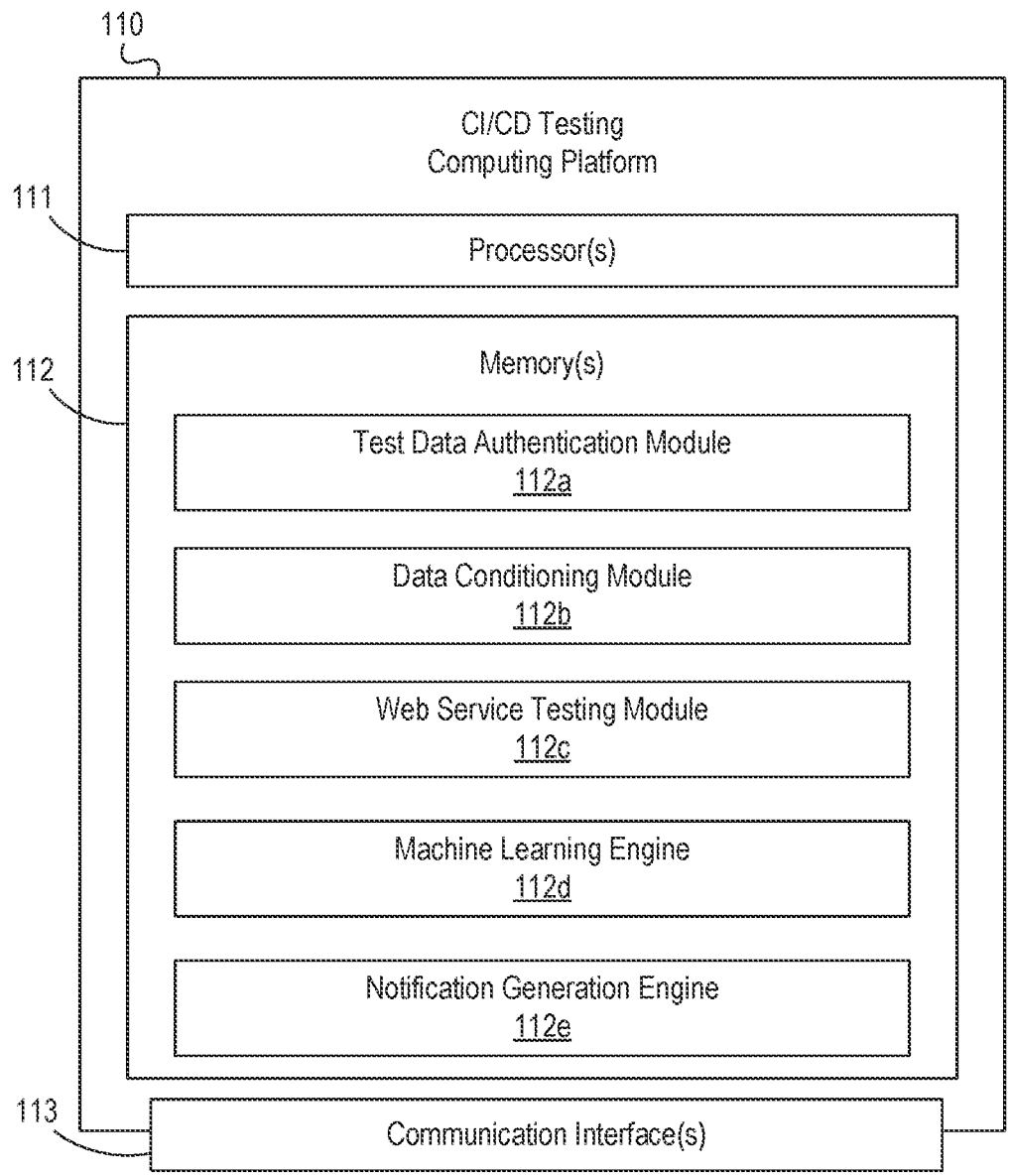

FIGS. 1A and 1B depict an illustrative computing environment for conducting software testing in a continuous integration and delivery environment using AI-generated test data in accordance with one or more example embodiments. Referring to FIG. 1A, computing environment 100 may include one or more computer systems. For example, computing environment 100 may include a continuous integration and continuous delivery (CI/CD) testing computing platform 110, a web service computing platform 120, a training data storage platform 130, a historical data storage platform 140, an enterprise server infrastructure 150, and a developer computing device 160. Computing environment 100 also may include one or more computing platforms. For example, and as noted above, computing environment 100 may include CI/CD testing computing platform 110.

As illustrated in greater detail below, computing environment 100 also may include one or more networks, which may interconnect one or more of CI/CD testing computing platform 110, web service computing platform 120, training data storage platform 130, historical data storage platform 140, enterprise server infrastructure 150, and developer computing device 160. For example, computing environment 100 may include a network 170 (which may, e.g., interconnect CI/CD testing computing platform 110, web service computing platform 120, training data storage platform 130, historical data storage platform 140, enterprise server infrastructure 150, developer computing device 160, and/or one or more other systems which may be associated with an enterprise organization, such as a financial institution, with one or more other systems, public networks, sub-networks, and/or the like).

As illustrated in greater detail below, CI/CD testing computing platform 110 may include one or more computing devices configured to perform one or more of the functions described herein. For example, CI/CD testing computing platform 110 may include one or more computers (e.g., laptop computers, desktop computers, servers, server blades, or the like) configured to perform one or more of the functions described herein, as discussed in greater detail below. CI/CD testing computing platform 110 may be configured to host and/or execute an AI engine and/or a machine learning engine to provide dynamic data manipulation and software application functions. In some examples, CI/CD testing computing platform 110 may be connected to one or more developer computing platforms or devices to receive software codes for test executions. In some examples, CI/CD testing computing platform 110 may be connected to one or more data owner storage platforms for receiving various data sets to be used as input for creating test data for running test code executions, or the like.

CI/CD testing computing platform 110 may include distinct and physically separate data centers or other groupings of server computers that are operated by and/or otherwise associated with an organization, such as a financial institution. In addition, CI/CD testing computing platform 110 may house a plurality of server computers and various other computers, network components, and devices. For example, CI/CD testing computing platform 110 may include a plurality of server nodes that are made up of and/or otherwise include one or more servers and/or server blades, which may be monitored and/or controlled by CI/CD testing computing platform 110 and/or one or more other computing devices included in computing environment 100. Each server and/or server blade included in the plurality of server nodes associated with CI/CD testing computing platform 110 may include one or more processors, memories, communication interfaces, storage devices, and/or other components.

The CI/CD testing computing platform 110 may execute test software codes, based on information and/or code parameters received from a developer computing platform or developer computing device. The CI/CD testing computing platform 110 may receive actual historical data from a data storage platform, or a training data set from a data storage platform, to be used in creating a test data set for running a test software code execution. For instance, such data may be obtained dynamically, on the fly, and without being saved to permanent storage on the CI/CD testing computing platform 110, as will be described in greater detail below.

Web service computing platform 120 may include one or more computing devices and/or other computer components (e.g., processors, memories, communication interfaces). In addition, and as illustrated in greater detail below, web service computing platform 120 may be configured to receive information from, send information to, and/or otherwise exchange information with one or more devices that are physically present at and/or within a certain range of the enterprise location at which enterprise server infrastructure 150 may be deployed. The enterprise location (e.g., where enterprise server infrastructure 150 is deployed) may be remote from and/or different from a location where the CI/CD testing computing platform 110 and/or the web service computing platform 120 is deployed.

Training data storage platform 130 may include one or more computing devices and/or other computer components (e.g., processors, memories, communication interfaces). In addition, and as illustrated in greater detail below, training data storage platform 130 may be configured to receive information from, send information to, and/or otherwise exchange information with one or more devices that are physically present at and/or within a certain range of an enterprise location (e.g., a banking center, a financial services center, an automated teller machine vestibule, or another enterprise location) at which training data storage platform 130 may be deployed.

Historical data storage platform 140 may include one or more computing devices and/or other computer components (e.g., processors, memories, communication interfaces). In addition, and as illustrated in greater detail below, historical data storage platform 140 may be configured to receive information from, send information to, and/or otherwise exchange information with one or more devices that are physically present at and/or within a certain range of an enterprise location (e.g., a banking center, a financial services center, an automated teller machine vestibule, or another enterprise location) at which historical data storage platform 140 may be deployed.

Although depicted as two separate components in FIG. 1A, in some examples, training data storage platform 130 and historical data storage platform 140 may be combined in a single platform or may be combined with the CI/CD testing computing platform 110.

Enterprise server infrastructure 150 may include one or more computing devices and/or other computer components (e.g., processors, memories, communication interfaces). In addition, enterprise server infrastructure 150 may be configured to host, execute, and/or otherwise provide one or more enterprise applications. For example, enterprise server infrastructure 150 may be configured to host, execute, and/or otherwise provide an enterprise mobile application for user devices, and/or other programs associated with an enterprise server. In some instances, enterprise server infrastructure 150 may be configured to provide various enterprise and/or back-office computing functions for an enterprise organization, such as a financial institution. For example, enterprise server infrastructure 150 may include various servers and/or databases that store and/or otherwise maintain account information, such as financial account information including account balances, transaction history, account owner information, and/or other information. In addition, enterprise server infrastructure 150 may process and/or otherwise execute tasks on specific accounts based on commands and/or other information received from other computer systems included in computing environment 100. Additionally, or alternatively, enterprise server infrastructure 150 may receive instructions from CI/CD testing computing platform 110 and execute the instructions in a timely manner, e.g., for the secure transfer of encrypted data.

Enterprise server infrastructure 150 may include multiple server computers that are owned, operated, maintained, and/or otherwise used by an organization, such as an enterprise organization associated with CI/CD testing computing platform 110. For example, enterprise server infrastructure 150 may include one or more server computers that store and/or otherwise maintain enterprise applications (which may, e.g., be executed by and/or provided to one or more computing devices associated with enterprise users) and/or enterprise information (which may, e.g., be accessed and/or used by the enterprise applications and/or by the one or more computing devices associated the with enterprise users).

For example, enterprise server infrastructure 150 may include one or more computer systems that are configured to provide one or more portal interfaces to one or more client devices and/or configured to authenticate one or more client devices and/or users of such devices to such portal interfaces. For example, enterprise server infrastructure 150 may include a computer system configured to provide a customer portal, such as an online banking portal, to one or more customers of an organization, such as a financial institution, who may use one or more computing devices to access the portal and/or who may be authenticated to one or more portal user accounts by the computer system using various authentication techniques. In some instances, in addition to being configured to provide an online banking portal associated with a financial institution to one or more customers of the financial institution and/or their associated computing devices, the computer system (which may, e.g., be included in enterprise server infrastructure 150) also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Additionally or alternatively, enterprise server infrastructure 150 may include one or more client account servers, which may be configured to store and/or maintain information associated with one or more client accounts. For example, the client account server(s) may be configured to store and/or maintain information associated with one or more financial accounts associated with one or more customers of a financial institution, such as account balance information, transaction history information, and/or the like. Additionally or alternatively, the client account server(s) may include and/or integrate with one or more client support servers and/or devices, such as one or more customer service representative devices used by one or more customer service representatives of an organization (which may, e.g., be a financial institution operating one or more computer systems in computing environment 100), to connect one or more customers of the organization with one or more customer service representatives of the organization via one or more telephone support sessions, chat support sessions, and/or other client support sessions.

Developer computing device 160 may include one or more computing devices and/or other computer components (e.g., processors, memories, communication interfaces). In addition, and as illustrated in greater detail below, developer computing device 160 may be configured to receive information from, send information to, and/or otherwise exchange information with one or more devices that are physically present at and/or within a certain range of the enterprise location at which enterprise server infrastructure 150 may be deployed. In some examples, however, the developer computing device 160 may be remote from and/or different from the enterprise location (e.g., where enterprise server infrastructure 150 is deployed).

Developer computing device 160 may be a desktop computing device (e.g., desktop computer, terminal), or the like or a mobile computing device (e.g., smartphone, tablet, smart watch, laptop computer, or the like). In addition, developer computing device 160 may be linked to and/or used by one or more enterprise users (who may, e.g., be employees of an enterprise organization operating the enterprise center where developer computing device 160 is deployed and/or used). For instance, developer computing device 160 may be deployed at an enterprise center, such as the enterprise center where enterprise server infrastructure 150 is deployed, so that developer computing device 160 may be used by one or more employees of an enterprise organization operating the enterprise center when such employees are facilitating enterprise software development efforts. For example, developer computing device 160 may store and/or execute one or more enterprise applications, such as user account management applications, user history applications, account security applications, and/or other software applications, which may be used by the one or more enterprise users of developer computing device 160.

In one or more arrangements, developer computing device 160, and other computing devices included in computing environment 100 may be any type of computing device capable of receiving a user interface, receiving input via the user interface, and communicating the received input to one or more other computing devices. For example, developer computing device 160 may, in some instances, be and/or include server computers, desktop computers, laptop computers, tablet computers, smart phones, or the like and may include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Web service computing platform 120 and/or developer computing device 160 may be configured to provide one or more interfaces that allow for configuration and management of one or more other computing devices and/or computer systems included in computing environment 100, such as one or more interfaces that allow for configuration and management of CI/CD testing computing platform 110. Web service computing platform 120 and/or developer computing device 160 may be configured to provide one or more interfaces that allow for interaction with and use of one or more other computing devices and/or computer systems included in computing environment 100, such as one or more interfaces that allow for interaction with and use of CI/CD testing computing platform 110.

In some arrangements, CI/CD testing computing platform 110, web service computing platform 120, training data storage platform 130, historical data storage platform 140, developer computing device 160, and enterprise server infrastructure 150 may be owned and/or operated by an enterprise organization, and/or deployed by enterprise centers that are owned and/or operated by the enterprise organization. As illustrated in greater detail below, some aspects of the disclosure may provide technical benefits that are not found in conventional systems, because CI/CD testing computing platform 110 is able to access various forms of data, e.g., historical data from the historical data storage platform 140 or training data from the training data storage platform 130, for the purpose of executing a test software application. Machine learning (e.g., by CI/CD testing computing platform 110) may be used to efficiently receive such data and modify that data for use in executing a test software application.

Web service computing platform 120, training data storage platform 130, historical data storage platform 140, developer computing device 160, and enterprise server infrastructure 150 may be configured to communicate with and/or connect to one or more computing devices or systems shown in FIG. 1A. For instance, web service computing platform 120 and/or developer computing device 160 may communicate with one or more computing systems or devices via network 170, while training data storage platform 130, historical data storage platform 140, and/or enterprise server infrastructure 150 may communicate with one or more computing systems or devices via network 170. In some examples, web service computing platform 120 and/or developer computing device 160 may be used to control or implement aspects of the functions performed by CI/CD testing computing platform 110, with respect to execution of one or more test execution codes, and the like.

In one or more arrangements, web service computing platform 120, training data storage platform 130, historical data storage platform 140, developer computing device 160, and/or enterprise server infrastructure 150 may be any type of computing device or combination of devices capable of performing the particular functions described herein. For example, web service computing platform 120, training data storage platform 130, historical data storage platform 140, developer computing device 160, and/or enterprise server infrastructure 150 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of web service computing platform 120, training data storage platform 130, historical data storage platform 140, developer computing device 160, and/or enterprise server infrastructure 150 may, in some instances, be special-purpose computing devices configured to perform specific functions.

As mentioned above, computing environment 100 also may include one or more networks, which may interconnect one or more of CI/CD testing computing platform 110, web service computing platform 120, training data storage platform 130, historical data storage platform 140, developer computing device 160, and/or enterprise server infrastructure 150. For example, computing environment 100 may include network 170. Network 170 may include one or more sub-networks (e.g., Local Area Networks (LANs), Wide Area Networks (WANs), or the like). Network 170 may be associated with a particular organization (e.g., a corporation, financial institution, educational institution, governmental institution, or the like) and may interconnect one or more computing devices associated with the organization.

For example, CI/CD testing computing platform 110, web service computing platform 120, training data storage platform 130, historical data storage platform 140, developer computing device 160, and/or enterprise server infrastructure 150, may be associated with an organization (e.g., a financial institution), and network 170 may be associated with and/or operated by the organization, and may include one or more networks (e.g., LANs, WANs, virtual private networks (VPNs), or the like) that interconnect CI/CD testing computing platform 110, web service computing platform 120, training data storage platform 130, historical data storage platform 140, developer computing device 160, enterprise server infrastructure 150, and one or more other computing devices and/or computer systems that are used by, operated by, and/or otherwise associated with the organization.

Network 170 may connect one or more computing devices connected thereto (e.g., CI/CD testing computing platform 110, web service computing platform 120, training data storage platform 130, historical data storage platform 140, developer computing device 160, enterprise server infrastructure 150) with one or more networks and/or computing devices that are not associated with the organization. For example, historical data storage platform 140 might not be associated with an organization that operates network 170 (e.g., historical data storage platform 140 may be owned, operated, and/or serviced by one or more entities different from the organization that operates network 170, such as one or more customers of the organization, public or government entities, and/or vendors of the organization, rather than being owned and/or operated by the organization itself or an employee or affiliate of the organization), and network 170 may include one or more networks (e.g., the internet) that connects historical data storage platform 140 to network 170 and/or one or more computing devices connected thereto.

In one or more arrangements, CI/CD testing computing platform 110, web service computing platform 120, training data storage platform 130, historical data storage platform 140, developer computing device 160, and/or enterprise server infrastructure 150 may be any type of computing device capable of receiving a user interface, receiving input via the user interface, and communicating the received input to one or more other computing devices. For example, CI/CD testing computing platform 110, web service computing platform 120, training data storage platform 130, historical data storage platform 140, developer computing device 160, enterprise server infrastructure 150, and/or the other systems included in computing environment 100 may, in some instances, include one or more processors, memories, communication interfaces, storage devices, and/or other components. As noted above, and as illustrated in greater detail below, any and/or all of CI/CD testing computing platform 110, web service computing platform 120, training data storage platform 130, historical data storage platform 140, developer computing device 160, and/or enterprise server infrastructure 150 may, in some instances, be special-purpose computing devices configured to perform specific functions.

Referring to FIG. 1B, CI/CD testing computing platform 110 may include one or more processors 111, one or more memories 112, and one or more communication interfaces 113. A data bus may interconnect the one or more processors 111, the one or more memories 112, and the one or more communication interfaces 113. Communication interface 113 may be a network interface configured to support communication between CI/CD testing computing platform 110 and one or more networks (e.g., network 170). Memory 112 may include one or more program modules having instructions that when executed by processor 111 cause CI/CD testing computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of CI/CD testing computing platform 110 and/or by different computing devices that may form and/or otherwise make up CI/CD testing computing platform 110. For example, memory 112 may have, store, and/or include test data authentication module 112a, a data conditioning module 112b, a web service testing module 112c, a machine learning engine 112d, and a notification generation engine 112e.

Test data authentication module 112a may provide and/or perform one or more functions that may enable receiving and authenticating test data from a data storage platform, e.g., training data storage platform 130, historical data storage platform 140, or the like, and may, at least temporarily, store the received test data. Test data authentication module 112a may perform authentication of a computing device associated with the received test data (e.g., training data storage platform 130, or historical data storage platform 140), and/or authentication module 112a may transmit one or more pieces of authentication information to another device (e.g., web service computing platform 120, enterprise server infrastructure 150) for authentication of the user. In some embodiments, authenticating may include causing display of a word or phrase. Test data authentication module may generate, request, send, and/or receive confirmation of authentication of a test data set prior to further modification or storage of that data set. Based on a data set being received and authenticated, test data authentication module 112a may allow additional functionality of the CI/CD testing computing platform 110. Additional features and functions that may be performed by test data authentication module 112*a* are described in greater detail below.

Data conditioning module 112*b* may have instructions that direct and/or cause CI/CD testing computing platform 110 to execute advanced techniques to provide one or more data conditioning and modification functions, such as reformatting of data entries, removing data anomalies, scrubbing confidential data, removing data points outside of specified ranges, and the like. Web service testing module 112*c* may include hardware components and/or executable instructions that enable and/or cause CI/CD testing computing platform 110 to provide a software testing service, such as the test software application for a particular web service as discussed below. Web service testing module 112*c* may store test specification details and/or other information associated with conducting software application code testing. Machine learning engine 112*d* may have instructions that direct and/or cause the CI/CD testing computing platform 110 to set, define, and/or iteratively refine optimization rules and/or other parameters used by the CI/CD testing computing platform 110 and/or other systems in computing environment 100.

Notification generation engine 112*e* may include hardware components and/or executable instructions that enable and/or cause CI/CD testing computing platform 110 to provide test code results, such as the test code results discussed below. Notification generation engine 112*e* may store test results data and/or other information that may result from and/or be determined based on conducting software application testing. Notification generation engine 112*e* may have instructions that direct and/or cause CI/CD testing computing platform 110 to send, to another computing device, results related to execution of a test software code. Notification generation engine 112*e* may store instructions and/or data that may cause or enable the CI/CD testing computing platform 110 to dynamically generate and/or execute notifications. For instance, in some examples, error information may be compiled following the execution of a test software code on the CI/CD testing computing platform 110. Accordingly, as test code result and error information is compiled, one or more notifications may be dynamically generated and transmitted to provide relevant information to a developer computing device associated with the test code (e.g., web service computing platform 120, developer computing device 160). For instance, the notification generation engine 112*e* may generate a notification for transmission to a developer device that simulates the output that might be presented if the test code was run locally on a developer computing device.

In some examples, requirement changes to a web service may be deployed by pushing a test code encompassing the requirement changes to a repository for deployment in a continuation integration and delivery environment. The computing platform may present an interface that receives a user selection of an environment, type of test code execution, code coverage parameters, performance parameters, functional requirements, threshold values, and the like. Some examples of such parameters may include performance testing with a specified load percentage, a code coverage testing percentage threshold, functional testing to cover new schema changes, and the like. As described herein, the computing platform may include an artificial intelligence system built with NLP, supervised learning model, recurrent reinforcement machine learning algorithms, and the like, to build customized test data sets.

In one example, a code coverage test may be performed, in which a user may select a threshold percentage of lines of codes to execute. Accordingly, the prepared test data set may cover the threshold percentage of the test code to deem the test code a success. Machine learning models using NLP techniques may read the code and identify new requirement conditions and subsequently may generate a test data set to validate the appropriate web service.

In another example, a performance load test may be performed, in which a user may select one or more thresholds and/or conditions to perform a stress/load test and predict the performance of the web service. Machine learning models may be trained using reinforcement learning algorithms to fetch multiple combinations of data from different sources, like external web services or external databases, so that the data may be used as input to perform the load test.

In one example, a predictive analysis may be performed based on load test results. Machine learning models may predict web service behavior based on load test results using data patterns recognition.

In another example, a functional test may be performed in which new XML schema changes, including addition of new data elements or modification to existing data types of the web elements, may be tested. Such schema changes may cause the fault occurrences in a test data set. Accordingly, machine learning model with NLP may be used to assess and modify a test data set based on the errors in the test results.

In another example, test data failures may be assessed and corrected. Where a test data failure has occurred, machine learning models may be training using reinforcement learning algorithms and/or supervised learning algorithms to connect to external web services/databases to generate a new test data set and use the new test data set as input to a subsequent test code execution.

In another example, a transport layer security (TLS) version update may be tested. If a web service has a TLS version update, a user might not be able to access the service in an environment having an older TLS version which results in a failure response from the service. Machine learning models may be trained using reinforcement learning algorithms and/or supervised learning algorithms so that in case of any further upgrades, the fault may be corrected by upgrading the TLS version in the specific environment.

In one example, a security assertions markup language (SAML) token authentication may be performed. Some web services may mandate that security tokens are unique and time bounded. In such cases, machine learning models may be trained to generate a SAML token and send in the token while accessing the web service.

Figure 2A:
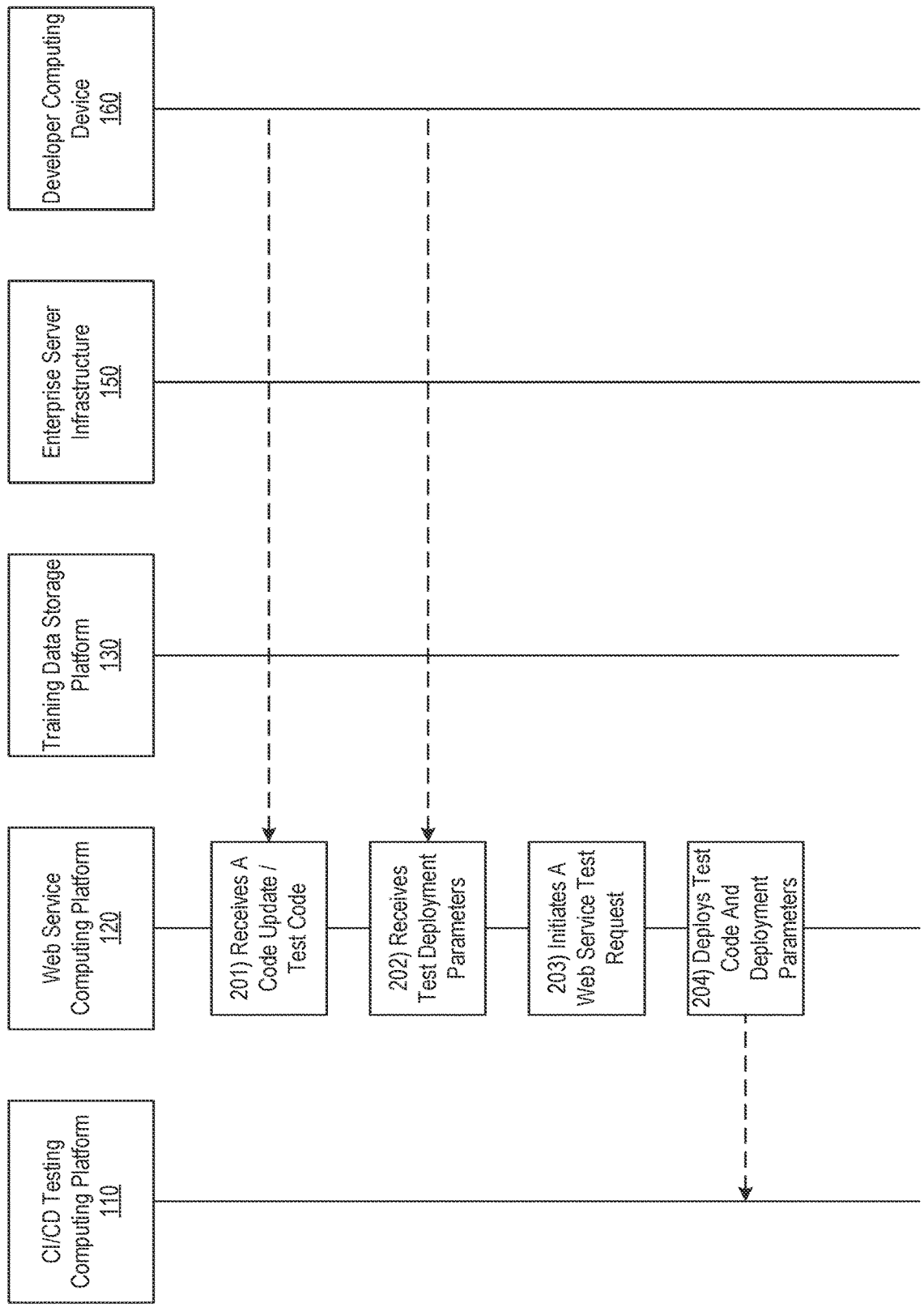

FIGS. 2A-2J depict an illustrative event sequence for conducting software testing in a continuous integration and delivery environment using AI-generated test data in accordance with one or more example embodiments. Referring to FIG. 2A, at step 201, the web service computing platform 120 may initially receive a test code or code update from a developer computing device 160 (and/or from one or more other sources). The test code or code update received at step 201 may relate specifically to a web service associated with the web service computing platform 120. For example, at step 201, the web service computing platform 120 may receive at least a portion of test specification information that may, for instance, include: information specifying one or more specific, different tests to run for one or more specific, different types of applications; information specifying one or more specific hosts and/or specific types of hosts those tests should be run on; information specifying how to launch those tests (e.g., information specifying command line functions, arguments, parameters, and/or other launch information); and/or the like. The tests that may be defined in the test code request received by the web service computing platform 120 from developer computing device 160 may include any type of software application tests, such as security-related tests, server-side tests and/or service-based architecture tests, fat-client and/or heavy-user-interface tests, user-application tests, web-based application tests, and/or other types of tests.

At step 202, the web service computing platform 120 may receive one or more test deployment parameters for running the test code from a developer computing device 160 (and/or from one or more other sources). In some instances, one or more test deployment parameters for running the test code received at step 202 may include coding or programming languages, frameworks, dependencies, relying subsystems, cache parameters, environments, and the like.

At step 203, the web service computing platform 120 may initiate a web service test execution request (e.g., identifying a particular web service application to be tested, a particular environment for conducting such testing, and the like) for deployment to a testing computing platform, e.g., separate from the web service computing platform 120. In some embodiments, initiating the web service test execution request at the web service computing platform 120 may include assembling and providing information identifying a specific software application to be tested in a specific computing environment. In some examples, initiating the web service test execution request at the web service computing platform 120 at step 203 may include authenticating a request to run a test code or to update a code, e.g., to verify that the developer device associated with the web service test request is a verified device or that a user at the developer device is a verified user.

Figure 3:
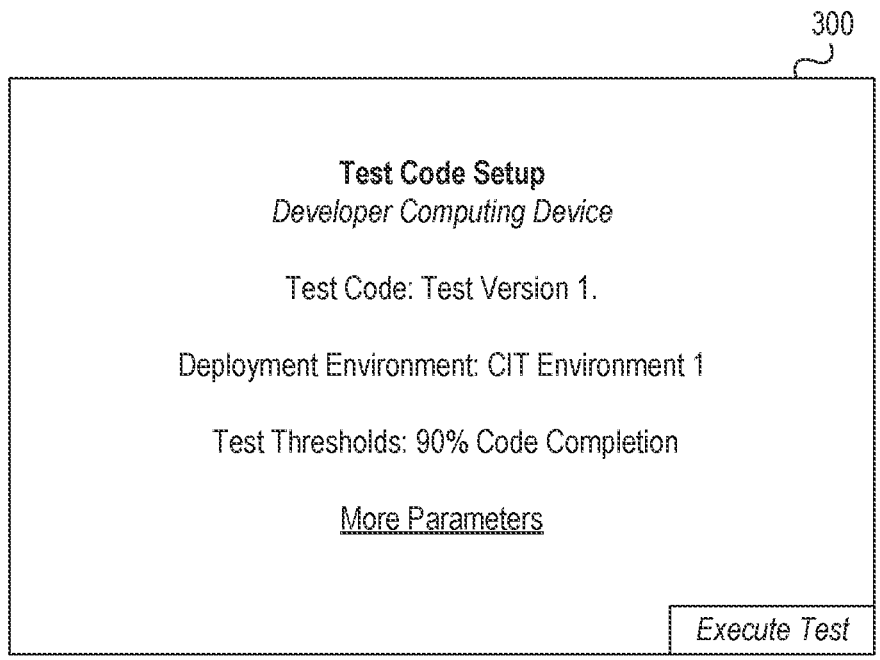
FIGS. 3-6 depict example graphical user interfaces for conducting software testing in a continuous integration and delivery environment using AI-generated test data in accordance with one or more example embodiments.

In some instances, initiating the web service test execution request at the web service computing platform 120 at step 203 may include receiving a message and/or other information from developer computing device 160 corresponding to one or more selections made via one or more graphical user interfaces presented by web service computing platform 120, such as graphical user interface 300, which is depicted in FIG. 3. As seen in FIG. 3, graphical user interface 300 may include one or more user interface elements enabling a user of developer computing device 160 to specify a particular code to be tested and a particular environment for testing the application, to specify other options associated with the testing, such as a test threshold requirement, and/or to selectively initiate the test execution request.

Based on the web service test execution request, at step 204, the web service computing platform 120 may transmit the test code and the one or more test deployment parameters for running the test code to the CI/CD testing computing platform 110. For example, at step 204, the test code and the one or more test deployment parameters for running the test code transmitted to the CI/CD testing computing platform 110 may be based on, or the same as, the test code and the one or more parameters for running the test code received at respective steps 201 and 202. In some instances, at step 203, CI/CD testing computing platform 110 may receive, via a communication interface (e.g., communication interface 113), from the web service computing platform 120, the web service test execution request. In some examples, in receiving the web service test execution request from the web service computing platform 120, CI/CD testing computing platform 110 may receive information identifying a specific software application to be tested in a specific computing deployment environment.

Figure 2B:
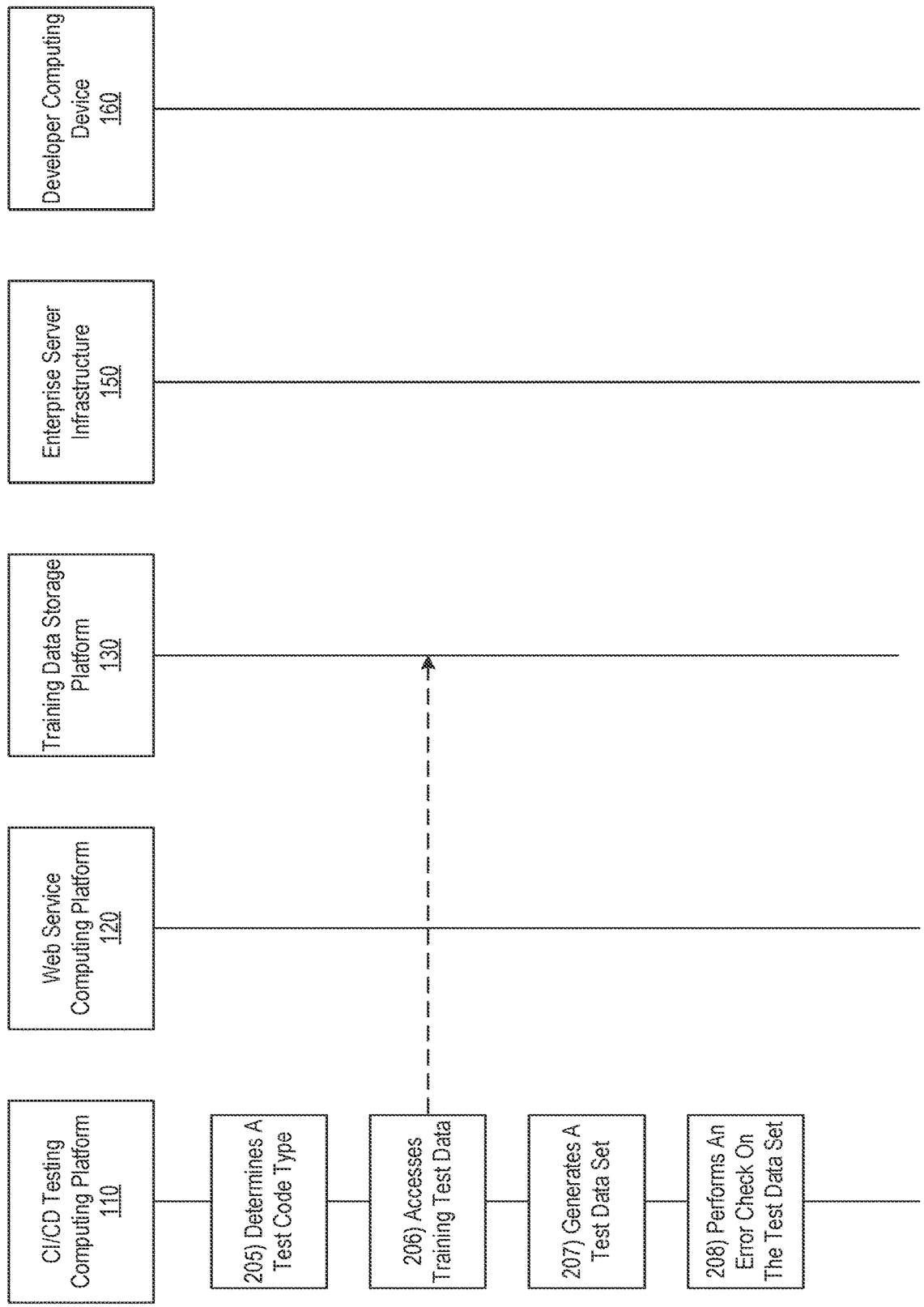

Referring to FIG. 2B, at step 205, CI/CD testing computing platform 110 may determine a test code type based on information in the web service test execution request, e.g., based on the test code and the one or more test deployment parameters for running the test code. For example, at step 205, CI/CD testing computing platform 110 may identify one or more tests to execute based on the test code received from the web service computing platform 120 at step 201. CI/CD testing computing platform 110 may, for instance, identify the one or more tests to execute by matching information from the web service test execution request (which may, e.g., specify a particular application to be tested in a particular environment) with corresponding test specification details information (which may, e.g., specify what tests should be run to facilitate testing of the particular application, where such tests should be run, how such tests should be launched, and/or the like) so as to initiate and/or complete testing of the specified application in the specified environment.

At step 206, CI/CD testing computing platform 110 may access training test data from the training data storage platform 130. The training test data accessed at step 206 may be identified and/or selected from data stored in the training data storage platform 130 in accordance with the test code type determined at step 205. In some instances, accessing training test data at step 206 may include establishing a secure connection with the training data storage platform, e.g., where any proprietary and/or confidential information in contained in the training data set for the web service test execution request. The CI/CD testing computing platform 110 may, in some instances, perform a verification of the training test data, e.g., using the test data authentication module 112a.

At step 207, CI/CD testing computing platform 110 may generate a test data set based on the training data set accessed at step 206. For example, at step 207, CI/CD testing computing platform 110 may send, via the communication interface (e.g., communication interface 113), to the training data storage platform 130, one or more data request execution commands directing the training data storage platform 130 to transmit the one or more training datasets identified based on the relevant portions of the test execution code and/or test specification details information received from the web service computing platform 120 and/or the developer computing device 160. And upon identifying such one or more training datasets, the CI/CD testing computing platform 110 may perform one or more functions to modify the one or more training datasets to generate a test data set of a suitable format for input in the test code.

In some examples, generating the test data set at step 207 may include dynamic data manipulation, e.g., that may use machine learning to generate a pseudo-real dataset. For instance, at step 207, the CI/CD testing computing platform 110 may apply a machine learning model for the generation of a test data set using the training data set as a starting point and modifying the training data set based on one or more characteristics of the test code and/or the test deployment parameters. For example, the CI/CD testing computing platform 110 may train a machine learning classification model to the training data set accessed by the CI/CD testing computing platform 110 using data from prior code execution results. For instance, CI/CD testing computing platform 110 may train the machine learning model to generate a pseudo-real test dataset from the training data set based on one or more characteristics of the test code and/or the test deployment parameters. In training the machine learning model to generate test data, CI/CD testing computing platform 110 may compute a dataset that mimics actual data but is in a format suitable for the test code to be executed.

At step 208, the CI/CD testing computing platform 110 may perform an error check on the test data set generated at step 207. For example, at step 208, after generating the test data set at step 207, the CI/CD testing computing platform 110 may perform one or more processes on the test data set to check for any errors in the test data set or any test data formatting issues associated with the test code to be executed. For instance, at step 207, generating the test data set may include converting and/or transforming the training test data using mathematical calculations and algorithms. Performing the error check on the test data set at step 208 may include using an algorithm or other processing technique to ensure that converting and/or transforming of the training test data did not introduce any errors into the generated test data set. Performing the error check at step 208 may include processing the test data set to check for any instances of data anomalies.

Referring to FIG. 2C, at step 209, CI/CD testing computing platform 110 may autocorrect one or more errors in the test data set based on the error check performed at step 208. For example, at step 209, CI/CD testing computing platform 110 may remove one or more data anomalies that were identified in performing the error check at step 208. As part of autocorrecting one or more errors in the test data set at step 209, CI/CD testing computing platform 110 may, for instance, reformat the test data set based on one or more portions of the test data set where formatting errors were identified in performing the error check at step 208. The test data set also may, for instance, be autocorrected in accordance with a data conditioning algorithm of the data conditioning module 112b the CI/CD testing computing platform 110.

At step 210, CI/CD testing computing platform 110 may build and compile the test code to be executed in accordance with the web service test request. For example, at step 210, the CI/CD testing computing platform 110 may build, via the web service testing module 112c, the test code to be executed in accordance with the web service test request. In some instance, building and compiling the test code at step 210 may include identifying a selected test code environment and building and compiling the test code for execution in the selected test code environment.

At step 211, CI/CD testing computing platform 110 may deploy and execute the test code in the selected test code environment. For example, at step 211, the CI/CD testing computing platform 110 may progress through execution of the test code including portions where the test data set is read in and used. In some instances, while continuing to execute the test code, CI/CD testing computing platform 110 may generate one or more user interfaces having status information indicative of the progress of the testing. In addition, CI/CD testing computing platform 110 may send such user interfaces to the web service computing platform 120 and/or the developer computing device 160 and/or otherwise cause the web service computing platform 120 and/or the developer computing device 160 to display such user interfaces. For example, while executing the test code, CI/CD testing computing platform 110 may generate and send to the web service computing platform 120 and/or the developer computing device 160 a graphical user interface that includes status information identifying the web service application currently being tested and the environment in which the web service application is being tested, progress information identifying how far along the testing is, and/or other user interface elements enabling a user of the web service computing platform 120 and/or the developer computing device 160 to specify other options associated with the testing. Such interfaces may be presented at any time during execution of the test code, and/or up until completion of the test code.

At step 212, upon completion of the test code execution, the CI/CD testing computing platform 110 may receive and compile test code results that results from running the test code. Such results may include a simple pass or fail indicator, and/or error information relating to any errors encountered. In compiling test code results, CI/CD testing computing platform 110 may capture raw test output and/or may process the raw test output. For instance, CI/CD testing computing platform 110 may harvest and/or otherwise capture what is occurring on the CI/CD testing environment computing platform 110 as the test code is being executed and may interrogate data received to determine whether specific tests within the test code are passing or failing. In addition, CI/CD testing computing platform 110 may write results data to a results database (e.g., on the web service testing module 112c).

In some embodiments, the compiled test code results may include results from one or more command line instructions that may cause the CI/CD testing computing platform 110 to run one or more tests that write pass-fail output associated with the one or more tests to a console. For example, the one or more command line instructions to be executed by the CI/CD testing computing platform 110 may cause the CI/CD testing computing platform 110 to run one or more tests that write pass-fail output associated with the one or more tests to a console.

In some embodiments, compiling test code results at step 212 may include capturing the pass-fail output associated with the one or more tests from the console. For example, in capturing the test output, CI/CD testing computing platform 110 may capture the pass-fail output associated with the one or more tests from the console. For instance, the CI/CD testing computing platform 110 may capture the pass-fail output associated with the one or more tests using one or more regular expressions and/or other output capture tools, as discussed in the examples above.

In some embodiments, compiling test code results at step 212 may include processing the test output captured to produce test results data. For example, in capturing the test execution output, the CI/CD testing computing platform 110 may process the test execution output captured to produce test results data. The test results data may, for instance, include information identifying specific tests that passed, specific tests that failed, specific hosts that executed specific tests, and/or other information associated with the testing.

In some embodiments, compiling test code results at step 212 may include determining that a first set of tests passed based on the test output captured and based on determining that a second set of tests failed based on the test output captured. For example, in processing the test output captured to produce the test results data, the CI/CD testing computing platform 110 may determine that a first set of tests passed based on the test output captured and may determine that a second set of tests failed based on the test output captured.

In some embodiments, compiling test code results at step 212 may include compiling timestamps indicating when one or more specific tests started and ended, information identifying a name of a specific host on which the one or more specific tests were run, information identifying a number of assertions that passed, and information identifying a number of assertions that failed. For example, in compiling test code results at step 212, the CI/CD testing computing platform 110 may store timestamps indicating when one or more specific tests started and ended on the web service testing module 112c of the CI/CD testing computing platform 110, information identifying a name of a specific host associated with web service testing module 112c on which the one or more specific tests were run, information identifying a number of assertions that passed during the testing executed on the web service testing module 112c, information identifying a number of assertions that failed during the testing executed on web service testing module 112c, and/or other information associated with the testing executed on the web service testing module 112c.

Figure 2D:
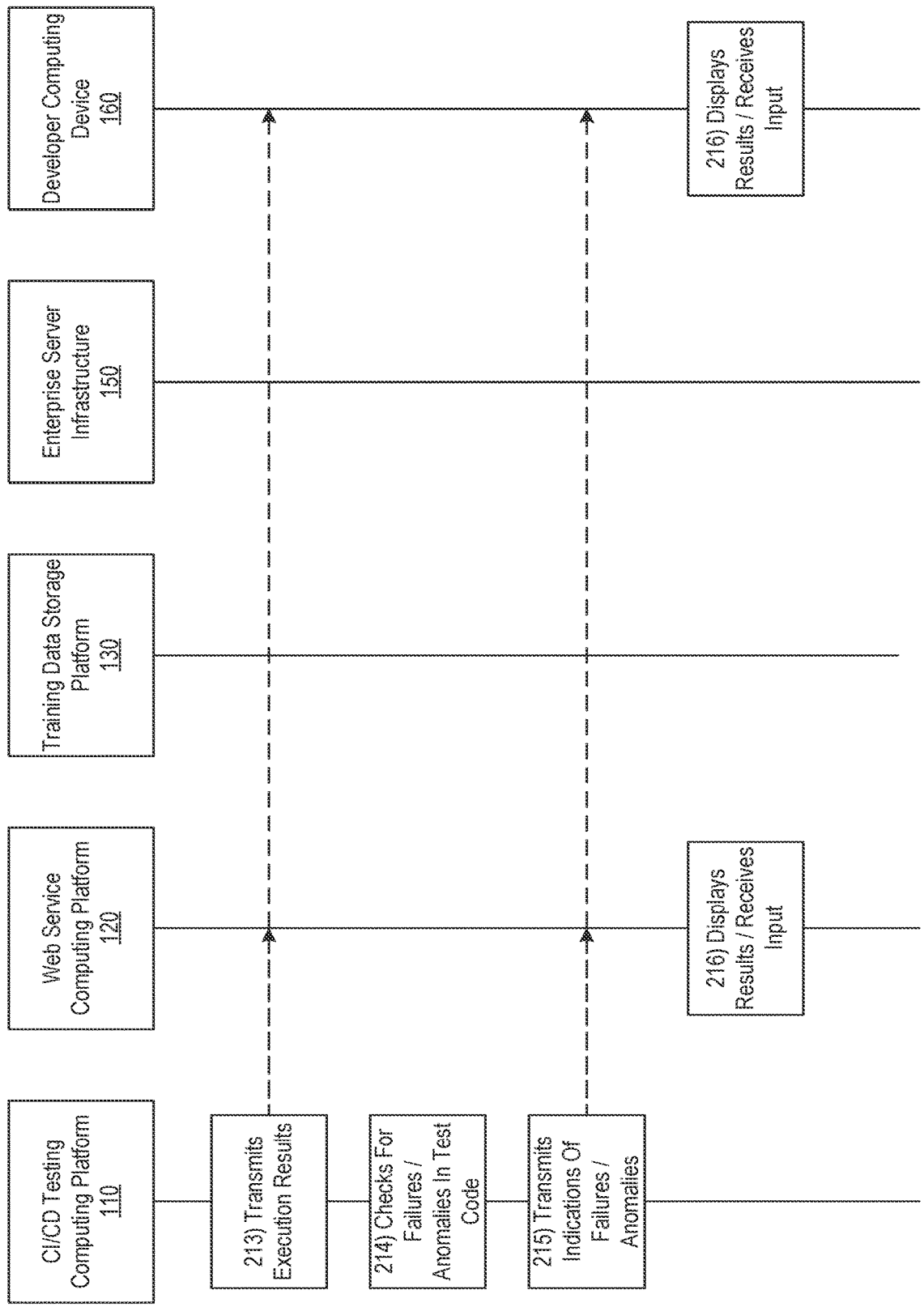

Referring to FIG. 2D, at step 213, CI/CD testing computing platform 110 may transmit the test code results to the web service computing platform 120 and/or to the developer computing device 160. Information included in the transmitted results may include a simple pass or fail indicator, and/or error information relating to any errors encountered. In some instances, CI/CD testing computing platform 110 may capture raw test output and/or may process the raw test output to be included in the transmitted results. For instance, CI/CD testing computing platform 110 may harvest and/or otherwise capture what occurred on the CI/CD testing computing platform 110 as the test code is being executed and may interrogate data received to determine whether specific tests within the test code are passing or failing, and may include such information in the transmitted executed results. In addition, CI/CD testing computing platform 110 may write results data to a results database (e.g., on the web service testing module 112c) prior to transmitting the results data at step 213.

At step 214, the CI/CD testing computing platform 110 may perform a check on the compiled test results data to check for any failures or anomalies in the test code. While failures or anomalies may have already been identified as part of compiling the test code results at step 212, the verification check at step 213 may serve as an additional step to verify the presence of any additional or undetected failures or anomalies from the test results data. In some examples, step 214 may occur upon CI/CD testing computing platform 110 determining an initial indication of a failure in the compiled test results. In that regard, performing the check on the compiled test results data at step 214 may serve to further identify and characterize one or more errors from the test results data. In some examples, CI/CD testing computing platform 110 may identify the presence of errors or anomalies in the compiled test code results based on based on a type of test result involved and expected output for the type of test.

In examples where the CI/CD testing computing platform 110 identified errors or anomalies in the compiled test results data, the CI/CD testing computing platform 110 may transmit one or more indications of identified errors or anomalies to the web service computing platform 120 and/or to the developer computing device 160 at step 215. In some examples, transmitting the one or more indications of identified errors or anomalies may include modifying the indications to a format that is presentable to a developer computing device (e.g., web service computing platform 120 and/or developer computing device 160). In some instances, at step 216, the CI/CD testing computing platform 110 may receive one or more updates or modifications relating to the test code and/or the test data set that was previously executed on the CI/CD testing computing platform 110. In some examples, the updates or modifications received at step 216 may be in response to error information received as part of the test code results received at step 215.

Figure 4:
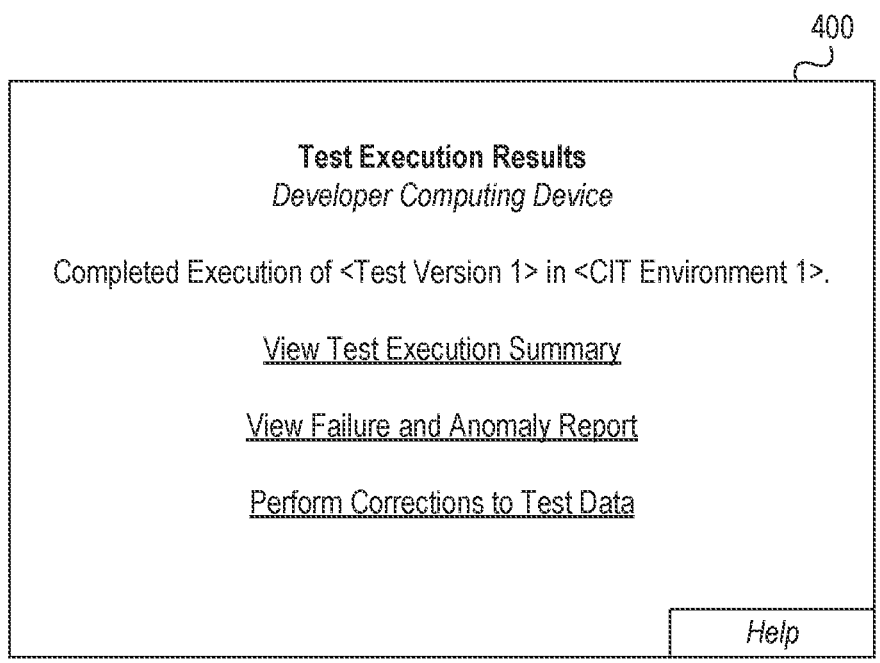

At step 216, CI/CD testing computing platform 110 may display the compiled test code results (and, in at least some instances, indications of any identified failures or anomalies) to the web service computing platform 120. In some instances, the web service computing platform 120 may provide the test code results for display on one or more other computing devices or systems, such as a computing device of the enterprise server infrastructure 150, developer computing device 160, and the like. In some examples, the developer computing platform or device that sent the test code and test execution request may be the same computing platform or device to which the web service computing platform 120 provides and displays test code results at step 216. In some instances, the web service computing platform 120 may provide a message and/or other information corresponding to one or more results from executing the test code, and may include one or more graphical user interfaces presented or displayed on the web service computing platform 120 or developer computing device 160, such as graphical user interface 400, which is depicted in FIG. 4. As seen in FIG. 4, graphical user interface 400 may include one or more user interface elements enabling a user of the web service computing platform 120 or the developer computing device 160 to access a test summary report associated with the execution of the test code by the CI/CD testing computing platform 110, access detailed test results associated with the execution of the test code by CI/CD testing computing platform 110, and/or access other options associated with execution of the test code by CI/CD testing computing platform 110. As seen in FIG. 4, graphical user interface 400 may include one or more user interface elements enabling a user of the web service computing platform 120 or the developer computing device 160 to view raw test results data associated with the execution of the test code by the CI/CD testing computing platform 110, and may further a selectable option to perform one or more corrections to the test data set where the CI/CD testing computing platform 110 has detected such failures or anomalies in the test execution results.

While graphical user interface 300 of FIG. 3 and the graphical user interface 400 of FIG. 4 are depicted for display on the web service computing platform 120 or the developer computing device 160, similar graphical user interfaces may also be generated, displayed, and/or otherwise presented on other computing devices or systems, such as a computing device of the enterprise server infrastructure 150, CI/CD testing computing platform 110, and the like.

Figure 2E:
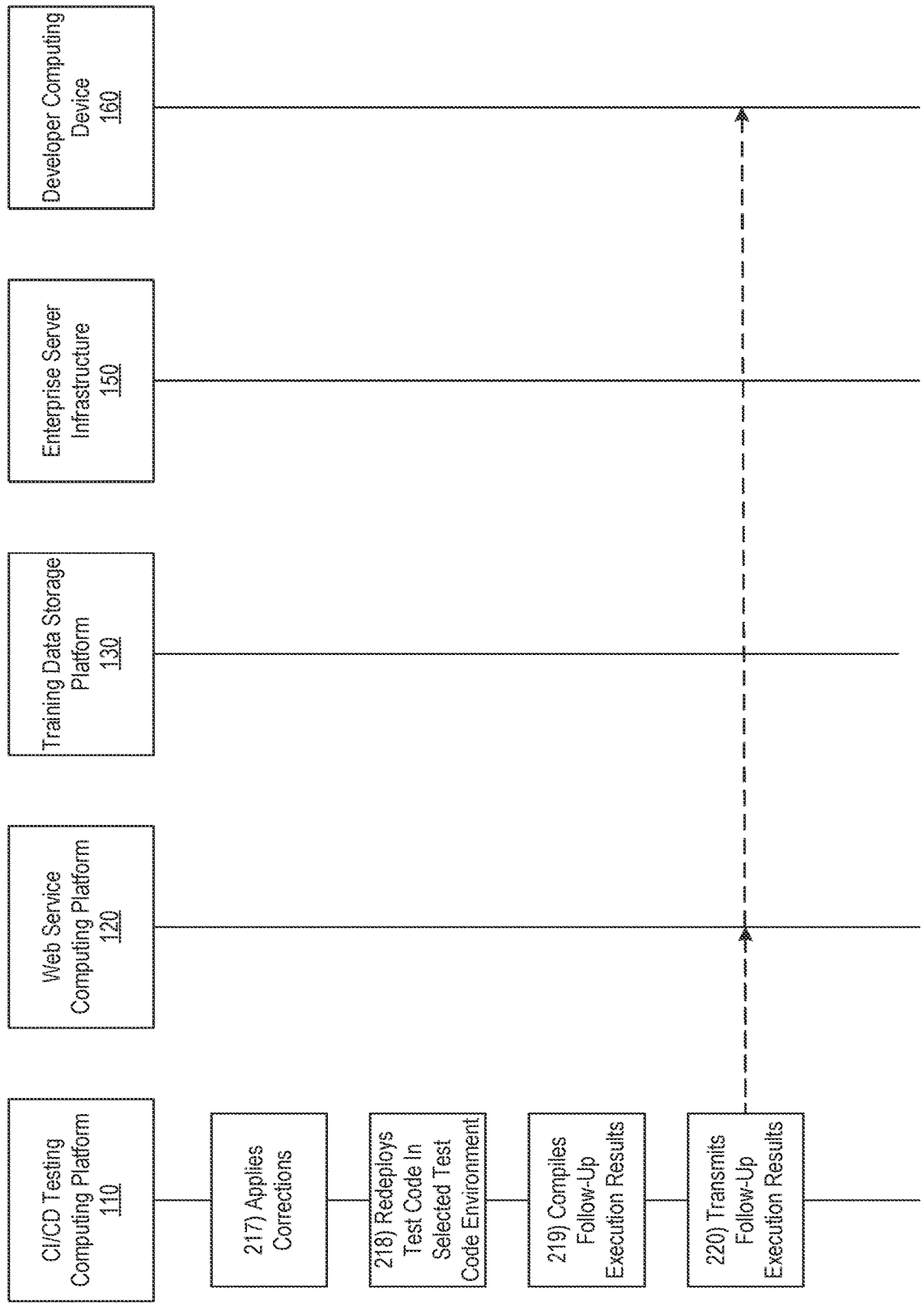

Referring to FIG. 2E, at step 217, upon receiving user input relating to displayed test execution results and any identified failures or anomalies, the CI/CD testing computing platform 110 may apply one or more corrections to the test data set. In some instances, the one or more corrections performed at step 217 may be the result of external changes to the code or to the training data set that are unrelated to information obtained in the previous execution of the test code. In some instances, the one or more corrections performed at step 217 may include modifications to how data is used or read into the code, based on test code results obtained during the previous test code execution and using the test data set.

At step 218, the CI/CD testing computing platform 110 may redeploy the test code in the selected test code environment. For example, at step 218, the CI/CD testing computing platform 110 may progress through execution of the test code (or in some instances, a corrected test code) including portions where the corrected test data set is read in and used. In some instances, while continuing to execute the test code, CI/CD testing computing platform 110 may generate one or more user interfaces having status information indicative of the progress of the testing. In addition, CI/CD testing computing platform 110 may send such user interfaces to the web service computing platform 120 and/or the developer computing device 160 and/or otherwise cause the web service computing platform 120 and/or the developer computing device 160 to display such user interfaces. For example, while executing the test code, CI/CD testing computing platform 110 may generate and send to the web service computing platform 120 and/or the developer computing device 160 a graphical user interface that includes status information identifying the web service application currently being tested and the environment in which the web service application is being tested, progress information identifying how far along the testing is, and/or other user interface elements enabling a user of the web service computing platform 120 and/or the developer computing device 160 to specify other options associated with the testing. Such interfaces may be presented at any time during execution of the test code, and/or up until completion of the test code.

At step 219, upon completion of the follow-up test code execution, the CI/CD testing computing platform 110 may receive and compile follow-up test code results that results from running the follow-up test code. Such results may include a simple pass or fail indicator, and/or error information relating to any errors encountered. In compiling test code results, CI/CD testing computing platform 110 may capture raw test output and/or may process the raw test output. For instance, CI/CD testing computing platform 110 may harvest and/or otherwise capture what is occurring on the CI/CD testing environment computing platform 110 as the test code is being executed and may interrogate data received to determine whether specific tests within the test code are passing or failing. In addition, CI/CD testing computing platform 110 may write results data to a results database (e.g., on the web service testing module 112c). In some instances, compiling the follow-up test code execution results may include any number of steps similar to those discussed above for step 212.

At step 220, CI/CD testing computing platform 110 may transmit the follow-up test code results to the web service computing platform 120 and/or to the developer computing device 160. Information included in the transmitted results may include a simple pass or fail indicator, and/or error information relating to any errors encountered. In some instances, CI/CD testing computing platform 110 may capture raw test output and/or may process the raw test output to be included in the transmitted results. For instance, CI/CD testing computing platform 110 may harvest and/or otherwise capture what occurred on the CI/CD testing computing platform 110 as the test code is being executed and may interrogate data received to determine whether specific tests within the test code are passing or failing, and may include such information in the transmitted executed results. In addition, CI/CD testing computing platform 110 may write results data to a results database (e.g., on the web service testing module 112c) prior to transmitting the results data at step 220.

Figure 2F:
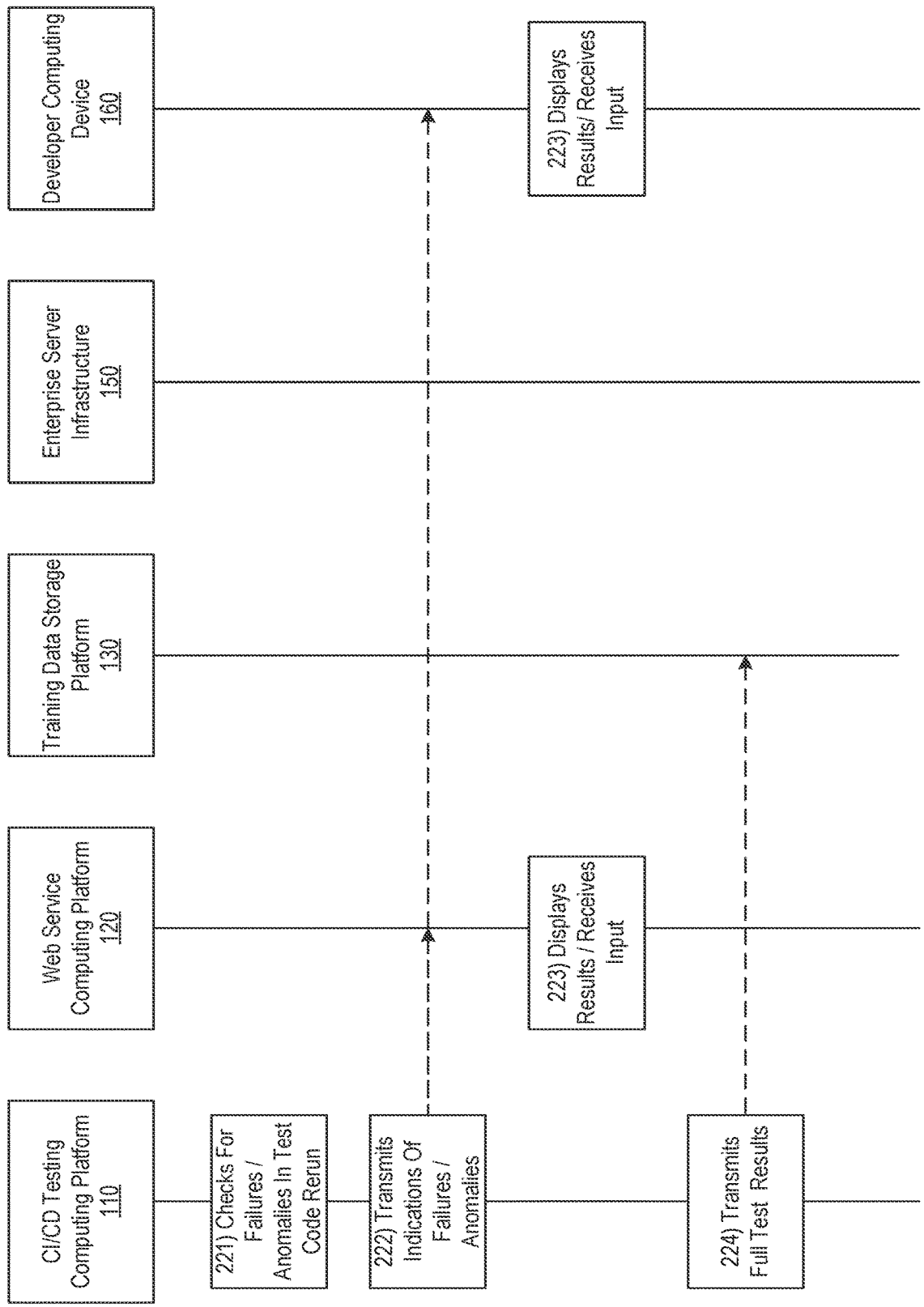

Referring to FIG. 2F, at step 221, the CI/CD testing computing platform 110 may perform a check on the follow-up test results data to check for any failures or anomalies in the follow-up test code and related test data set. While failure or anomalies may have already been identified as part of compiling the follow-up test code results at step 219, the verification check at step 221 may serve as an additional step to verify the presence of any additional or undetected failures or anomalies from the test results data. In some examples, step 221 may occur upon CI/CD testing computing platform 110 determining an initial indication of a failure in the compiled follow-up test results. In that regard, performing the check on the compiled follow-up test results data at step 221 may serve to further identify and characterize one or more errors from the follow-up test results data. In some examples, CI/CD testing computing platform 110 may identify the presence of errors or anomalies in the compiled follow-up test code results based on a type of test result involved and expected output for the type of test.

In examples where the CI/CD testing computing platform 110 identified errors or anomalies in the compiled follow-up test results data, at step 221, the CI/CD testing computing platform 110 may transmit one or more indications of identified errors or anomalies to the web service computing platform 120 and/or to the developer computing device 160 at step 222. In some examples, transmitting the one or more indications of identified errors or anomalies may include modifying the indications to a format that is presentable to a developer computing device (e.g., web service computing platform 120 and/or developer computing device 160).

At step 223, the transmitted results (and, in at least some instances, indications of any identified failures or anomalies) may be displayed at the web service computing platform 120 and/or the developer computing device 160. In some instances, the web service computing platform 120 may provide the test code results for display on one or more other computing devices or systems, such as a computing device of the enterprise server infrastructure 150, developer computing device 160, and the like. In some examples, the developer computing platform or device that sent the test code and test execution request may be the same computing platform or device to which the web service computing platform 120 provides and displays test code results at step 223. In some instances, the web service computing platform 120 may provide a message and/or other information corresponding to one or more results from executing the test code, and may include one or more graphical user interfaces presented or displayed on the web service computing platform 120 or developer computing device 1460, similar to the graphical user interface 400 depicted in FIG. 4, and which may include one or more user interface elements enabling a user of the web service computing platform 120 or the developer computing device 160 to access a test summary report associated with the execution of the test code by the CI/CD testing computing platform 110, access detailed test results associated with the execution of the test code by CI/CD testing computing platform 110, and/or access other options associated with execution of the test code by CI/CD testing computing platform 110. In some instances, the graphical user interface may include one or more user interface elements enabling a user of the web service computing platform 120 or the developer computing device 160 to view raw test results data associated with the execution of the test code by the CI/CD testing computing platform 110, and may further a selectable option to perform one or more corrections to the test data set where the CI/CD testing computing platform 110 has detected such failures or anomalies in the test execution results.

The process discussed with respect to steps 217-223 may repeated any number of times, e.g., until suitable results are obtained, until no errors or anomalies are noted, upon a certain number of test iterations being completed, and the like. Subsequently, at step 224, the full test results may be transmitted to the training data storage platform 130, and may be used, e.g., for updating or modifying the training data set stored thereon. In that regard, the full test results transmitted at step 224 may include instructions for a modification of the training data set based on learning from the one or more test execution results previously obtained. In some examples, the machine learning engine 112*d* of the CI/CD testing computing platform 110 may have instructions that direct and/or cause the CI/CD testing computing platform 110 to set, define, and/or iteratively refine optimization rules and/or other parameters used for the modification of the training data set based on results obtained from executing a test code. In some instances, the full test results transmitted at step 224 may include a notification that the training data set is operating as intended and/or that no further modifications are recommended to the training data set based on the full test results.

Now referring to FIG. 2G, at step 225, the CI/CD testing computing platform 110 may transmit a result report to the developer computing device 160. In some instances, transmitting the result report to the developer computing device 160 may include receiving a request for the result report via a web dashboard provided as part of a user interface display provided at step 216 or step 223. For example, in receiving a confirmation of test code execution result from the developer computing device 160, the CI/CD testing computing platform 110 may receive a request for a result report via a web dashboard provided as part of the user interface display on the developer computing device 160. Such a web dashboard may, for instance, be provided by CI/CD testing computing platform 110 to the developer computing device 160 and/or may include one or more of the example user interfaces discussed above.

Subsequently, at step 226, the developer computing device 160 may provide a result report interface, e.g., on a user interface display on the developer computing device 160. In some embodiments, transmitting the result report to the developer computing device 160 may include transmitting test code results information via an application programming interface. For example, in transmitting the result report to the developer computing device 160 and providing the result report interface at the developer computing device 160, CI/CD testing computing platform 110 and/or web service computing platform 120 may receive a request for the result report via an application programming interface. For instance, such an application programming interface may expose one or more functions provided by CI/CD testing computing platform 110 to other applications on other devices, such as developer computing device 160, and an application executing on developer computing device 160 may utilize one or more function calls provided by the application programming interface to request the test code results information.

At step 227, the developer computing device 160 may receive one or more inputs relating to integrations of the test code that was previously executed on the CI/CD testing computing platform 110. In some examples, the input received at step 227 may be response to error information, e.g., a confirmation of no errors, received as part of the result report received at step 225. In some instances, the input received at step 227 may include external changes to the code that are unrelated to information obtained in the previous execution of the test code. In some instances, the input received at step 227 may include modifications to how data is used or read into the code, based on test code results obtained during the previous test code execution. At step 228, the developer computing device 160 may push the test code for deployment on the web service computing platform 120.

Figure 2I:
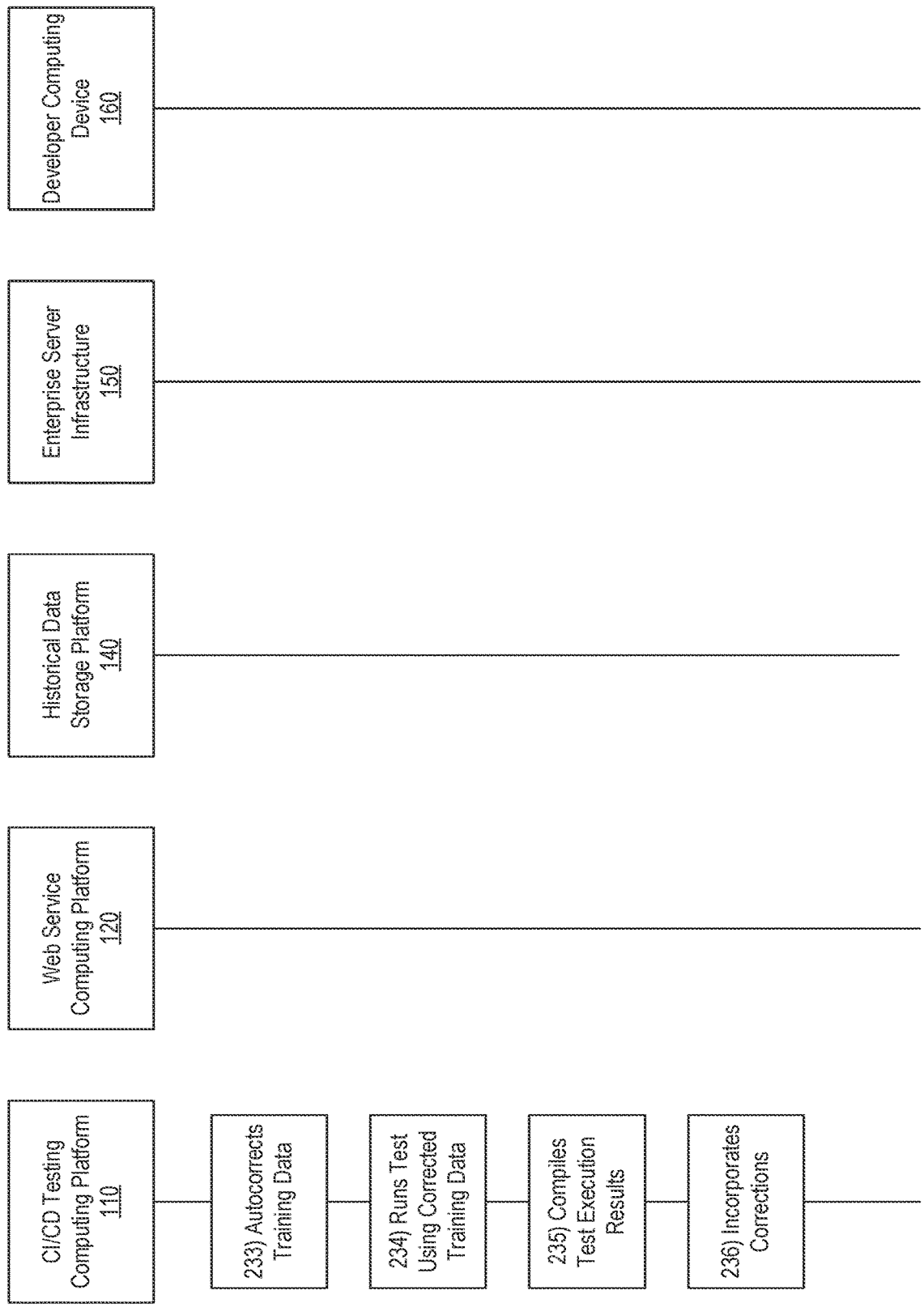

Now referring to FIGS. 2H-2J, an event sequence for conducting software testing in a continuous integration and delivery environment using AI-generated test data based on historical web service data is illustrated. As shown in FIG. 2H, at step 229, the historical data storage platform 140 may receive historical data, e.g., relating to data associated with a web service application, from the web service computing platform 120 and/or the enterprise server infrastructure 150. The historical data accessed at step 229 may be identified and/or selected for transmission to the historical data storage platform 140 in accordance with the data satisfying one or more data storage requirements relating to the web service application. In some instances, receiving historical data at step 229 may include establishing a secure connection with the web service computing platform 120 and/or the enterprise server infrastructure 150, e.g., where any proprietary and/or confidential information is contained in the historical data for the web service application. The historical data storage platform 140 may, in some instances, perform a verification of the historical data received at step 229.

At step 230, the historical data storage platform 140 may initiate a masking process on the historical data, e.g., for the removal of any confidential or proprietary information. For example, at step 230, upon receipt of new historical data, the historical data storage platform 140 may automatically initiate a masking process to mask any confidential or proprietary information in the received data. In some embodiments, a particular masking process may be identified or selected based on a specific software application or a specific computing environment associated with the received data. For example, in receiving the historical data, the historical data storage platform 140 may also receive information identifying a specific software application and/or a specific computing environment associated with the historical data. In some instances, initiating the masking process at step 230 may include authenticating the received historical data, e.g., to verify that the historical data is received from a verified computing platform or computing system. Upon scrubbing the historical data of any confidential or proprietary information, the scrubbed data may be moved for storage in the historical data storage platform 140 at step 231.

At step 232, the historical data storage platform 140 may provide a training data set to the CI/CD testing computing platform 110 based on historical data stored in the historical data storage platform 140. For example, at step 232, CI/CD testing computing platform 110 may send, via the communication interface (e.g., communication interface 113), to the historical data storage platform 140, one or more data request execution commands directing the historical data storage platform 140 to transmit one or more training datasets, which may be identified based one or more test specification details. And upon identifying such one or more training datasets, the CI/CD testing computing platform 110 may perform one or more functions to modify the one or more training datasets as needed.

Referring to FIG. 2I, At step 233, the CI/CD testing computing platform 110 may perform an error check and autocorrect any identified errors on the training data set provided at step 232. For example, at step 233, the CI/CD testing computing platform 110 may perform one or more processes on the training data set to check for any errors or any data formatting issues associated with the training data set. For instance, at step 233, autocorrecting the training data set may include converting and/or transforming the training test data using mathematical calculations and algorithms. Autocorrecting the training data set at step 233 may include using an algorithm or other processing technique to ensure that converting and/or transforming of the training test data did not introduce any errors. Autocorrecting the training data set at step 233 may include processing the training data set to check for any instances of data anomalies and automatically removing or modifying any identified anomalies. As part of autocorrecting one or more errors in the test data set at step 233, CI/CD testing computing platform 110 may, for instance, reformat the training data set based on one or more portions of the training data set where formatting errors were identified in. The training data set also may, for instance, be autocorrected in accordance with a data conditioning algorithm of the data conditioning module 112b the CI/CD testing computing platform 110.

In some examples, autocorrecting the training data set may include dynamic data manipulation, e.g., that may use machine learning to generate a pseudo-real dataset. For instance, at step 233, the CI/CD testing computing platform 110 may apply a machine learning model to generate a test data set using the training data set as a starting point and modifying the training data set based on one or more characteristics of the test code and/or the test deployment parameters. For example, the CI/CD testing computing platform 110 may train a machine learning classification model to the training data set accessed by the CI/CD testing computing platform 110 using data from prior code execution results. For instance, CI/CD testing computing platform 110 may train the machine learning model to generate a pseudo-real test dataset from the training data set based on one or more characteristics of the test code and/or the test deployment parameters. In training the machine learning model to generate test data, CI/CD testing computing platform 110 may compute a dataset that mimics actual data but is in a format suitable for the test code to be executed.

At step 234, CI/CD testing computing platform 110 may run a test code using the autocorrected training data set. For example, at step 234, the CI/CD testing computing platform 110 may progress through execution of the test code including portions where the training data set is read in and used. In some instances, while continuing to execute the test code, CI/CD testing computing platform 110 may generate one or more user interfaces having status information indicative of the progress of the testing. In addition, CI/CD testing computing platform 110 may send such user interfaces to the web service computing platform 120 and/or the developer computing device 160 and/or otherwise cause the web service computing platform 120 and/or the developer computing device 160 to display such user interfaces. For example, while executing the test code, CI/CD testing computing platform 110 may generate and send to the web service computing platform 120 and/or the developer computing device 160 a graphical user interface that includes status information identifying the web service application currently being tested and the environment in which the web service application is being tested, progress information identifying how far along the testing is, and/or other user interface elements enabling a user of the web service computing platform 120 and/or the developer computing device 160 to specify other options associated with the testing. Such interfaces may be presented at any time during execution of the test code, and/or up until completion of the test code.

At step 235, upon completion of running the test code, the CI/CD testing computing platform 110 may receive and compile test code results that result from running the test code. Such results may include a simple pass or fail indicator, and/or error information relating to any errors encountered. In compiling test code results, CI/CD testing computing platform 110 may capture raw test output and/or may process the raw test output. For instance, CI/CD testing computing platform 110 may harvest and/or otherwise capture what is occurring on the CI/CD testing environment computing platform 110 as the test code is being executed and may interrogate data received to determine whether specific tests within the test code are passing or failing. In addition, CI/CD testing computing platform 110 may write results data to a results database (e.g., on the web service testing module 112c). In some instances, at step 235 the CI/CD testing computing platform 110 may receive one or more updates or modifications relating to the test code and/or the training data set that was previously executed on the CI/CD testing computing platform 110. In some examples, the updates or modifications received at step 235 may be in response to error information received as part of compiling and providing the test code results.

In some embodiments, the compiled test code results may include results from one or more command line instructions that may cause the CI/CD testing computing platform 110 to run one or more tests that write pass-fail output associated with the one or more tests to a console. For example, the one or more command line instructions to be executed by the CI/CD testing computing platform 110 may cause the CI/CD testing computing platform 110 to run one or more tests that write pass-fail output associated with the one or more tests to a console. For instance, the one or more command line instructions to be executed by the CI/CD testing computing platform 110 may cause the CI/CD testing computing platform 110 to run one or more tests that write pass-fail outputs, as discussed in the examples above. Compiling test code results at step 235 may include capturing the pass-fail output associated with the one or more tests from the console. For example, in capturing the test output, CI/CD testing computing platform 110 may capture the pass-fail output associated with the one or more tests from the console. For instance, the CI/CD testing computing platform 110 may capture the pass-fail output associated with the one or more tests using one or more regular expressions and/or other output capture tools, as discussed in the examples above.

In some embodiments, compiling test code results at step 235 may include processing the test output captured to produce test results data. For example, in capturing the test execution output, the CI/CD testing computing platform 110 may process the test execution output captured to produce test results data. The test results data may, for instance, include information identifying specific tests that passed, specific tests that failed, specific hosts that executed specific tests, and/or other information associated with the testing. In some embodiments, compiling test code results at step 235 may include determining that a first set of tests passed based on the test output captured and based on determining that a second set of tests failed based on the test output captured. For example, in processing the test output captured to produce the test results data, the CI/CD testing computing platform 110 may determine that a first set of tests passed based on the test output captured and may determine that a second set of tests failed based on the test output captured.

In some embodiments, compiling test code results at step 235 may include compiling timestamps indicating when one or more specific tests started and ended, information identifying a name of a specific host on which the one or more specific tests were run, information identifying a number of assertions that passed, and information identifying a number of assertions that failed. For example, in compiling test code results at step 235, the CI/CD testing computing platform 110 may store timestamps indicating when one or more specific tests started and ended on the web service testing module 112c of the CI/CD testing computing platform 110, information identifying a name of a specific host associated with web service testing module 112c on which the one or more specific tests were run, information identifying a number of assertions that passed during the testing executed on the web service testing module 112c, information identifying a number of assertions that failed during the testing executed on web service testing module 112c, and/or other information associated with the testing executed on the web service testing module 112c.

Figure 5:
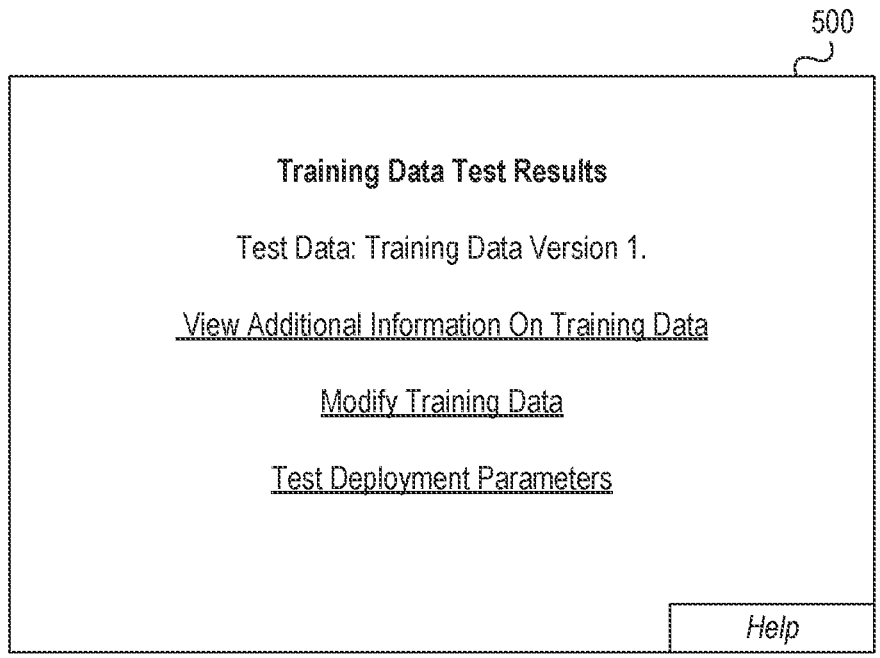

In some instances, in compiling test code results, the CI/CD testing computing platform 110 may receive a message and/or other information from web service computing platform 120 and/or developer computing device 160 corresponding to one or more selections made via one or more graphical user interfaces presented thereon, such as graphical user interface 500, which is depicted in FIG. 5. As seen in FIG. 5, graphical user interface 500 may include one or more user interface elements enabling a user of developer computing device 160 to verify the training data set used as part of the test code execution, view additional information relating to the training data set, interactively modify one or more aspects of the training data, view and/or modify one or more test deployment parameters, e.g., for the initiation of a subsequent test execution request, and the like.

At step 236, upon receiving user input relating to displayed test execution results and any identified failures or anomalies, the CI/CD testing computing platform 110 may incorporate one or more corrections to the training data set. In some instances, the one or more corrections performed at step 236 may be the result of external changes to the code or to the training data set that are unrelated to information obtained in the previous execution of the test code. In some instances, the one or more corrections performed at step 236 may include modifications to how data is used or read into the code, based on test code results obtained during the previous test code execution and using the training data set.

Figure 6:
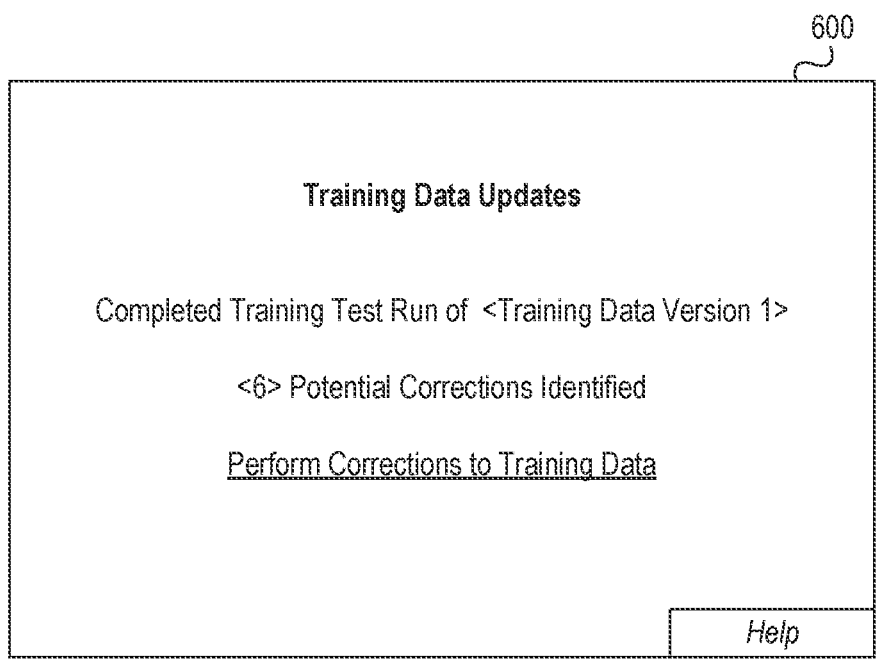

In some instances, incorporating corrections at step 236 may include receiving a message and/or other information from developer computing device 160 corresponding to one or more selections made via one or more graphical user interfaces presented by web service computing platform 120, such as graphical user interface 600, which is depicted in FIG. 6. As seen in FIG. 6, graphical user interface 600 may include one or more user interface elements enabling a user of developer computing device 160 to verify a training data set used during the completed test code execution, review a number of potential corrections identified, interactively receive input to perform corrections to the training data based on the potential corrections identified, and the like.

Referring to FIG. 2J, at step 237, the CI/CD testing computing platform 110 may rerun the test code with the corrected training data set. For example, at step 237, the CI/CD testing computing platform 110 may progress through execution of the test code (or in some instances, a corrected test code) including portions where the corrected training data set is read in and used. In some instances, while continuing to execute the test code, CI/CD testing computing platform 110 may generate one or more user interfaces having status information indicative of the progress of the testing. In addition, CI/CD testing computing platform 110 may send such user interfaces to the web service computing platform 120 and/or the developer computing device 160 and/or otherwise cause the web service computing platform 120 and/or the developer computing device 160 to display such user interfaces. For example, while executing the test code, CI/CD testing computing platform 110 may generate and send to the web service computing platform 120 and/or the developer computing device 160 a graphical user interface that includes status information identifying the web service application currently being tested and the environment in which the web service application is being tested, progress information identifying how far along the testing is, and/or other user interface elements enabling a user of the web service computing platform 120 and/or the developer computing device 160 to specify other options associated with the testing. Such interfaces may be presented at any time during execution of the test code, and/or up until completion of the test code.

Step 235 through step 237 may be repeated any number of times to perform additional correction to the training data set and/or to make other test code modification or deployment parameter modifications as needed.

At step 238, CI/CD testing computing platform 110 may transmit the test code results and corrected training data set (or information relating to the corrected training data set) to the training data storage platform 130. In some instances, the test code results and corrected training data set may also be transmitted to the historical data storage platform 140. Information included in the transmitted results may include the modifications and/or corrections made to the training data set. In some instances, CI/CD testing computing platform 110 may capture raw test output and/or may process the raw test output to be included in the transmitted results. For instance, CI/CD testing computing platform 110 may harvest and/or otherwise capture what occurred on the CI/CD testing computing platform 110 as the test code is being executed and may include such information in the transmitted executed results, e.g., in relation to modifying one or more aspects of the training data set. In addition, CI/CD testing computing platform 110 may write results data to a results database (e.g., on the web service testing module 112c) prior to transmitting the results data at step 238.

In some instances, at step 238, the CI/CD testing computing platform 110 may perform a verification check on the most recent execution result data to check for any failures or anomalies in the corrected training data set. While failure or anomalies may have already been identified as part of compiling the test code results, the verification check may serve as an additional step to verify the presence of any additional or undetected failures or anomalies from the training data set prior to making permanent changes to the data stored in the training data storage platform 130 and/or the historical data storage platform 140.

At step 239, based on the execution results and any corrections to the training data set, the training data storage platform 130 may apply machine learning to modify training data stored on the training data storage platform 130. In that regard, the information transmitted at step 238 may include instructions for a modification of the training data set based on learning from the one or more test execution results previously obtained. In some examples, the machine learning engine 112d of the CI/CD testing computing platform 110 may have instructions that direct and/or cause the CI/CD testing computing platform 110 to set, define, and/or iteratively refine optimization rules and/or other parameters used for the modification of the training data set based on results obtained from executing a test code. In some instances, the results transmitted at step 238 may include a notification that the training data set is operating as intended and/or that no further modifications are recommended to the training data set based on the full test results.

Subsequently, CI/CD testing computing platform 110 may repeat one or more steps of the example event sequence discussed above in conducting software testing in a continuous integration and delivery environment using AI-generated test data. Additionally or alternatively, CI/CD testing computing platform 110 may initiate one or more additional software testing executions, similar to how CI/CD testing computing platform 110 may initiate such processes and generate and send related results in the examples described above.

Figure 7:
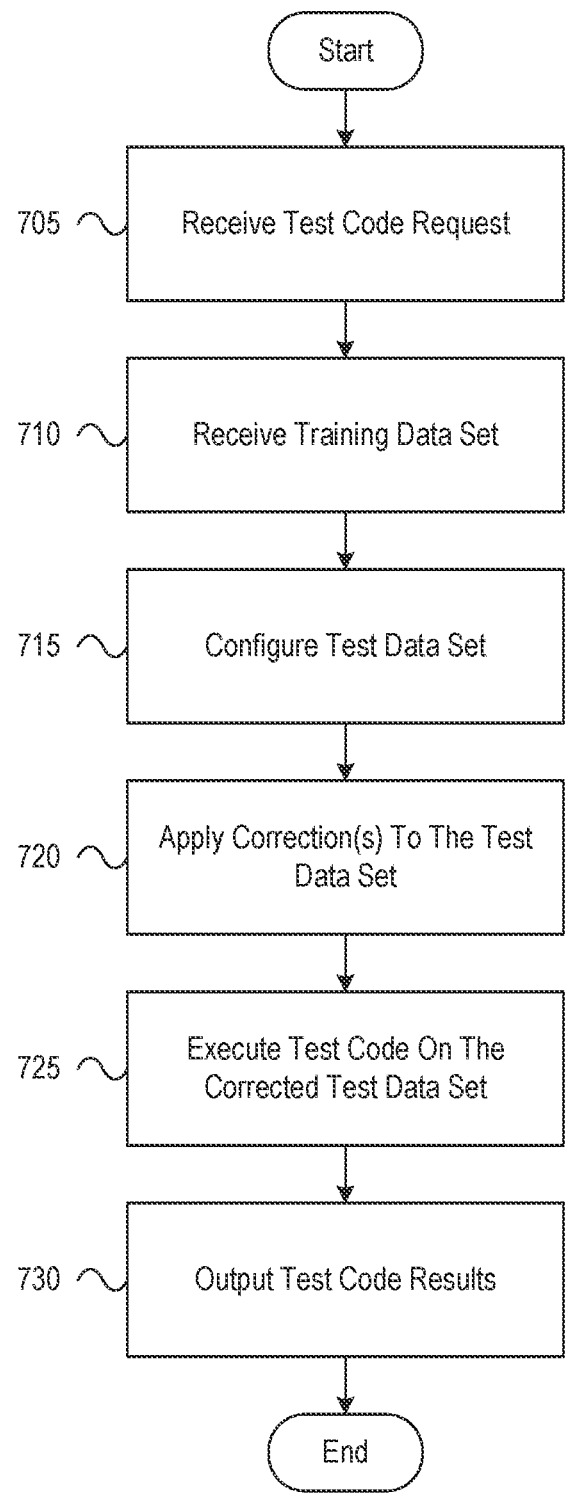
FIG. 7 depicts an illustrative method for building a test data set based on historical data and test code deployment parameters using AI models in accordance with one or more example embodiments.

FIG. 7 depicts an illustrative method for building a test data set based on historical data and test code deployment parameters using AI models in accordance with one or more example embodiments. Referring to FIG. 7, at step 705, a computing platform having at least one processor, a communication interface, and memory may receive a test code request from a developer computing platform or a developer computing device. The test code execution request may include a software test code for execution. The test code execution request may include one or more test deployment parameters for executing the test code. At step 710, the computing platform may receive a training data set from a web service computing platform. At step 715, the computing platform may configure a test data set based on the training data set and the test code request.

At step 720, the computing platform may use an AI engine to apply one or more corrections to the test data set based on the test code request. In some instances, using the AI engine may produce a corrected test data set. At step 725, the computing platform may execute the test code using the corrected test data set to produce test code output results. Executing the test code may then include executing the test code on a selected deployment environment, where the selected deployment environment may be received from the developer computing platform previously, e.g., as part of step 705. As part of executing the test code at step 725, the computing platform may decrypt the data received from the enterprise data storage database. At step 725, the computing platform may plug the test data set into the test code as applicable.

At step 730, the computing platform may compile and output test code output results. As part of outputting test code results at step 730, the computing platform may transmit, via the communication interface, the test code output results to one or more developer computing devices or platforms. Sending the test code output results may include providing a user interface display on a computing device associated with the developer computing platform. The user interface display may include information related to the test code output results.

Figure 8:
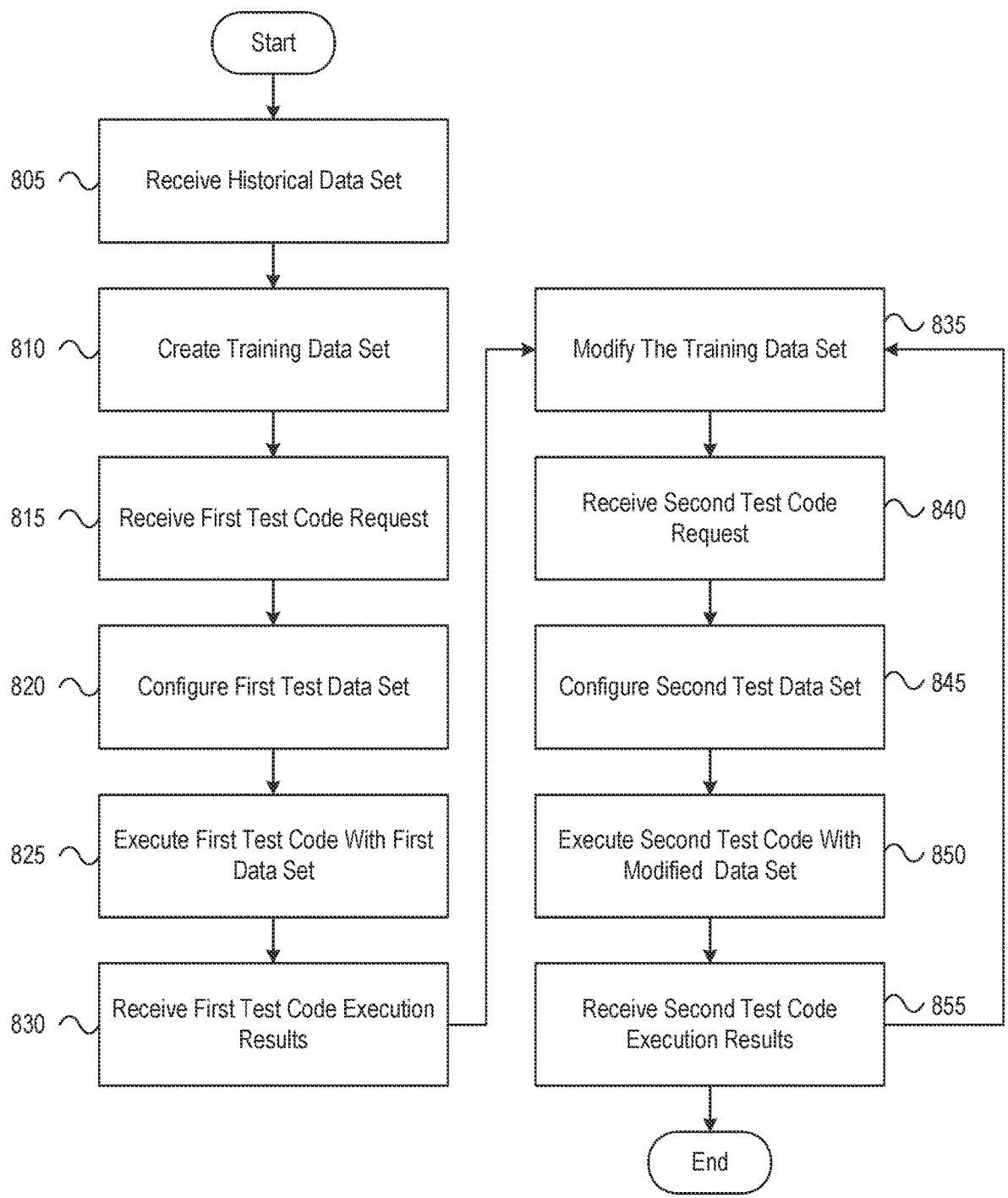
FIG. 8 depicts an illustrative method for conducting automated software testing in a continuous integration and delivery environment using AI-generated test data sets in accordance with one or more example embodiments.

FIG. 8 depicts an illustrative method for conducting automated software testing in a continuous integration and delivery environment using AI-generated test data in accordance with one or more example embodiments. Referring to FIG. 8, at step 805, a computing platform having at least one processor, a communication interface, and memory may receive a historical data set comprising data relating to a web service application from a web service computing platform. At step 810, the computing platform may create a training data set based on the historical data set. The training data set may include one or more components specific to a type of deployment environment and to a web service application. At step 815, the computing platform may receive, via the communication interface, a first test code request from a developer computing platform. The first test code request may include a first set of test code parameters.

At step 820, the computing platform may configure a first test data set from the training data set based on the first test code request. At step 825, upon configuring the first test data set, the computing platform may execute the first test code on the first data set. In some instances, executing the test code may include building and compiling the test code on the computing platform based on information received from the developer computing platform at step 815. At step 830, the computing platform may receive a first set of test code execution results that includes results from execution of a test code pursuant to the first test code request using the first set of test code parameters and the first test data set. Based on the first set of test code execution results received at step 830, the computing platform may modify the training data set at step 835. In some instances, modifying the training data set may include using an AI engine to modify the training data set based on the first set of test code execution results and producing a modified training data set using the AI engine.

At step 840, the computing platform may receive, via the communication interface, a second test code request from the developer computing platform. In some instances, the second test code request may include a second set of test code parameters. At step 845, in response to receiving the second test code request, the computing platform may configure a second test data set based on the modified training data set from step 835. At step 850, the computing platform may cause a second test to be executed based on the second test data set. At step 855, upon completion of the second test code, the computing platform may receive a second set of test code execution results that includes results from execution of a test code pursuant to the second test code request using the second test data set. Steps 835-855 may thereafter be repeated any number of times to implement and test additional modifications to the training data set and/or the test code for execution.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      create a training data set based on a historical data set relating to a web service application;
      receive, via the communication interface, a first test code request from a developer computing platform, wherein the first test code request includes a first set of test code parameters;
      configure a first test data set from the training data set based on the first test code request;
      cause a first test to be executed based on the first test data set; and
      use an artificial intelligence (AI) engine to modify the training data set based on a first set of test code execution results, wherein the first set of test code execution results includes results from execution of a test code pursuant to the first test code request using the first set of test code parameters and the first test data set, and wherein the AI engine produces a modified training data set.

2. The computing platform of claim 1, wherein the memory stores additional computer-readable instructions that, when executed by the at least one processor, cause the computing platform to:
   receive, via the communication interface, a second test code request from the developer computing platform, wherein the second test code request includes a second set of test code parameters;
   in response to receiving the second test code request, configure a second test data set based on the modified training data set; and
   cause a second test to be executed based on the second test data set.

3. The computing platform of claim 1, wherein the web service application provides back office functions for a financial institution.

4. The computing platform of claim 1, wherein the training data set includes one or more components specific to a type of deployment environment, and wherein the deployment environment comprises one of a component integration testing environment, a systems integration testing environment, and a technology testing environment.

5. The computing platform of claim 1, wherein the first set of test code parameters includes at least one of a threshold amount of test code to complete or a threshold amount of load.

6. The computing platform of claim 1, wherein configuring the first test data set from the training data set includes performing an error check on the first test data set.

7. The computing platform of claim 6, wherein configuring the first test data set from the training data set includes autocorrecting one or more errors in the first test data set based on the error check.

8. The computing platform of claim 1, wherein creating the training data set based on the historical data set includes:
   determining a test code type based on the web service application;
   accessing the historical data set from a historical data storage platform associated with the web service application; and
   generating the training data set based on the historical data set and in accordance with the test code type.

9. The computing platform of claim 1, wherein using the AI engine to modify the training data set includes:
   performing an anomaly check on the first set of test code execution results;
   performing a failure check on the first set of test code execution results; and
   modifying the training data set based on the anomaly check and the failure check.

10. The computing platform of claim 1, wherein using the AI engine to modify the training data set includes training a machine learning classification model to the first set of test code execution results to generate the modified training data set.

11. The computing platform of claim 1, wherein the memory stores additional computer-readable instructions that, when executed by the at least one processor, cause the computing platform to:
   transmit, to a developer computing platform, a result report including results relating to at least the first set of test code execution results, wherein the developer computing platform is configured to provide a result report interface displaying one or more components of the result report.

12. The computing platform of claim 11, wherein the result report interface includes a selectable option to push the test code for deployment in accordance based on an indication of success in the result report.

13. The computing platform of claim 1, wherein creating the training data set based on the historical data set includes performing a confidential data verification check, and upon detecting confidential data in the training data set, masking the confidential data in the training data.

14. The computing platform of claim 1, wherein creating the training data set based on the historical data set includes using the AI engine to modify the training data set based on test data parameters associated with one or more components specific to the first test code request.

15. A method comprising:
at a computing platform comprising at least one processor, a communication interface, and memory:
receiving, via the communication interface, a first test code request from a developer computing platform, wherein the first test code request includes a first set of test code parameters;
creating a training data set based on a historical data set relating to a web service application;
configuring a first test data set from the training data set based on the first test code request;
causing a first test to be executed based on the first test data set; and
using an AI engine to modify the training data set based on a first set of test code execution results, wherein the first set of test code execution results includes results from execution of a test code pursuant to the first test code request using the first set of test code parameters and the first test data set, and wherein the AI engine produces a modified training data set configured to be inputted during execution of a subsequent test.

16. The method of claim 15, further comprising:
receiving, via the communication interface, a second test code request from the developer computing platform, wherein the second test code request includes a second set of test code parameters;
in response to receiving the second test code request, configuring a second test data set based on the modified training data set; and
causing a second test to be executed based on the second test data set.

17. The method of claim 15, wherein creating the training data set based on the historical data set includes:
determining a test code type based on the web service application;
accessing the historical data set from a historical data storage platform associated with the web service application; and
generating the training data set based on the historical data set and in accordance with the test code type.

18. The method of claim 15, wherein configuring the first test data set from the training data set includes:
performing an error check on the first test data set; and
autocorrecting one or more errors in the first test data set based on the error check.

19. The method of claim 15, wherein using the AI engine to modify the training data set includes training a machine learning classification model to the first set of test code execution results to generate the modified training data set.

20. One or more non-transitory computer-readable media storing instructions that, when executed by a computing platform comprising at least one processor, a communication interface, and memory, cause the computing platform to:
create a training data set based on a historical data set;
receive, via the communication interface, a first test code request from a developer computing platform, wherein the first test code request includes a first set of test code parameters;
configure a first test data set from the training data set based on the first test code request;
cause a first test to be executed based on the first test data set;
use an AI engine to modify the training data set based on a first set of test code execution results, wherein the first set of test code execution results includes results from execution of a test code pursuant to the first test code request using the first set of test code parameters and the first test data set, and wherein the AI engine produces a modified training data set;
receive, via the communication interface, a second test code request from the developer computing platform, wherein the second test code request includes a second set of test code parameters;
in response to receiving the second test code request, configure a second test data set based on the modified training data set; and
cause a second test to be executed based on the second test data set.

* * * * *